United States Patent
Yamada

(10) Patent No.: US 9,195,915 B2
(45) Date of Patent: Nov. 24, 2015

(54) PRINTING APPARATUS, METHOD OF CHANGING LAYOUT, AND STORAGE MEDIUM

(71) Applicant: CANON KABUSHIKI KAISHA, Tokyo (JP)

(72) Inventor: Naoto Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 13/676,947

(22) Filed: Nov. 14, 2012

(65) Prior Publication Data

US 2013/0120768 A1 May 16, 2013

(30) Foreign Application Priority Data

Nov. 16, 2011 (JP) .................................. 2011-250852

(51) Int. Cl.
*H04N 1/00* (2006.01)
*G06F 3/12* (2006.01)
*G06K 15/02* (2006.01)
*G03G 15/00* (2006.01)

(52) U.S. Cl.
CPC .............. *G06K 15/02* (2013.01); *G03G 15/502* (2013.01); *G06F 3/1205* (2013.01); *G06F 3/125* (2013.01); *G06F 3/1256* (2013.01); *G06F 3/1284* (2013.01)

(58) Field of Classification Search
None
See application file for complete search history.

(56) References Cited

U.S. PATENT DOCUMENTS

| 5,425,138 | A | 6/1995 | Kumakawa | |
|---|---|---|---|---|
| 2002/0080405 | A1 | 6/2002 | Kuroda | |
| 2007/0182973 | A1* | 8/2007 | Godley | .......................... 358/1.6 |
| 2010/0275144 | A1* | 10/2010 | Dejoras et al. | ................ 715/769 |
| 2011/0181616 | A1 | 7/2011 | Sayers et al. | |
| 2012/0278727 | A1* | 11/2012 | Ananthakrishnan et al. | . 715/748 |

FOREIGN PATENT DOCUMENTS

| CN | 101193180 A | 6/2008 |
|---|---|---|
| CN | 101827189 A | 9/2010 |
| JP | 2005-64859 A | 3/2005 |
| JP | 2005-269539 A | 9/2005 |
| JP | 2005-322040 A | 11/2005 |
| JP | 2006-166220 A | 6/2006 |
| JP | 2010-36422 A | 2/2010 |
| RU | 2349953 C2 | 3/2009 |

* cited by examiner

*Primary Examiner* — Marcus T Riley
(74) *Attorney, Agent, or Firm* — Canon USA Inc. IP Division

(57) ABSTRACT

Logical pages are laid out on a physical page according to setting of a multipage printing condition. When a user drags a logical page, a layout of logical pages is changed based on an area to which the logical page is dragged.

17 Claims, 24 Drawing Sheets

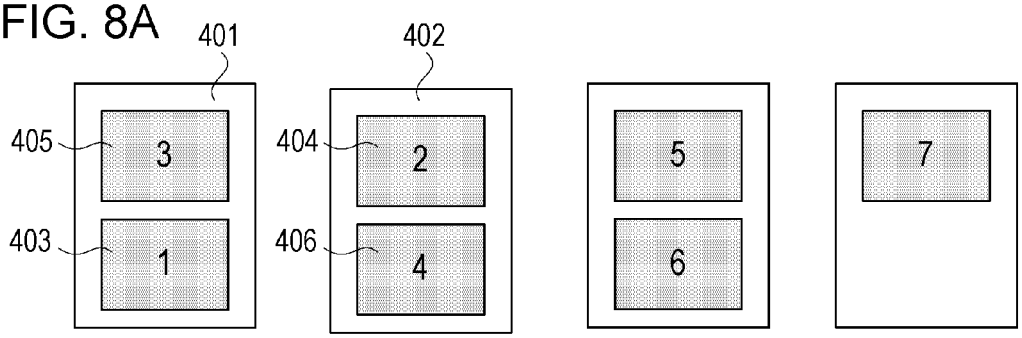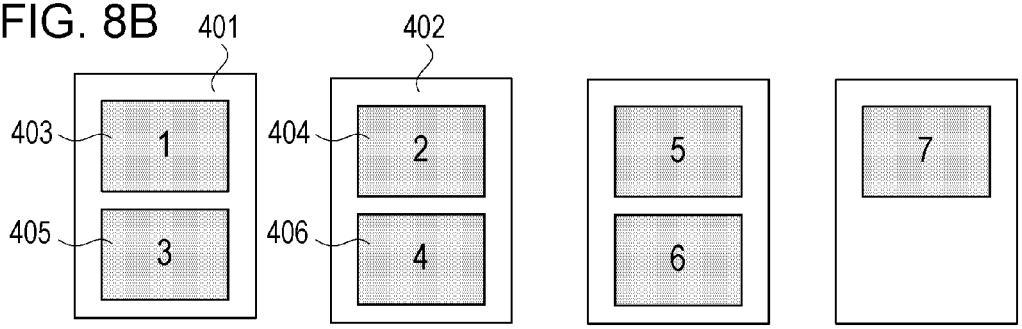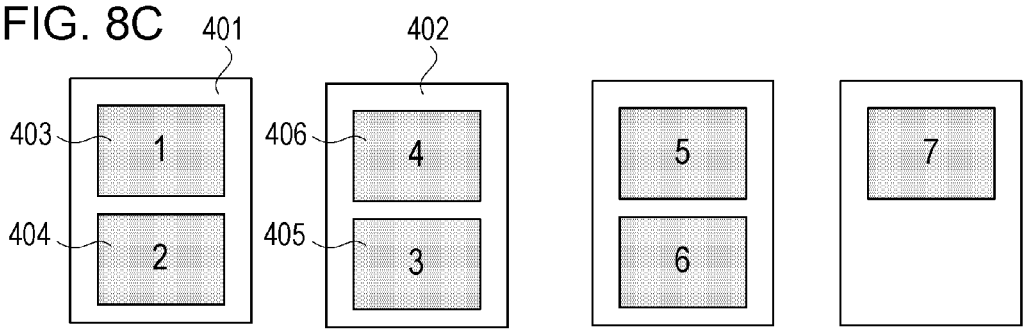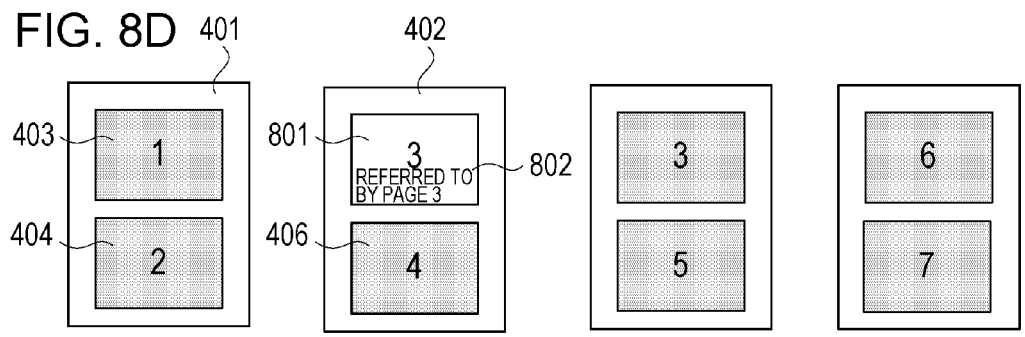

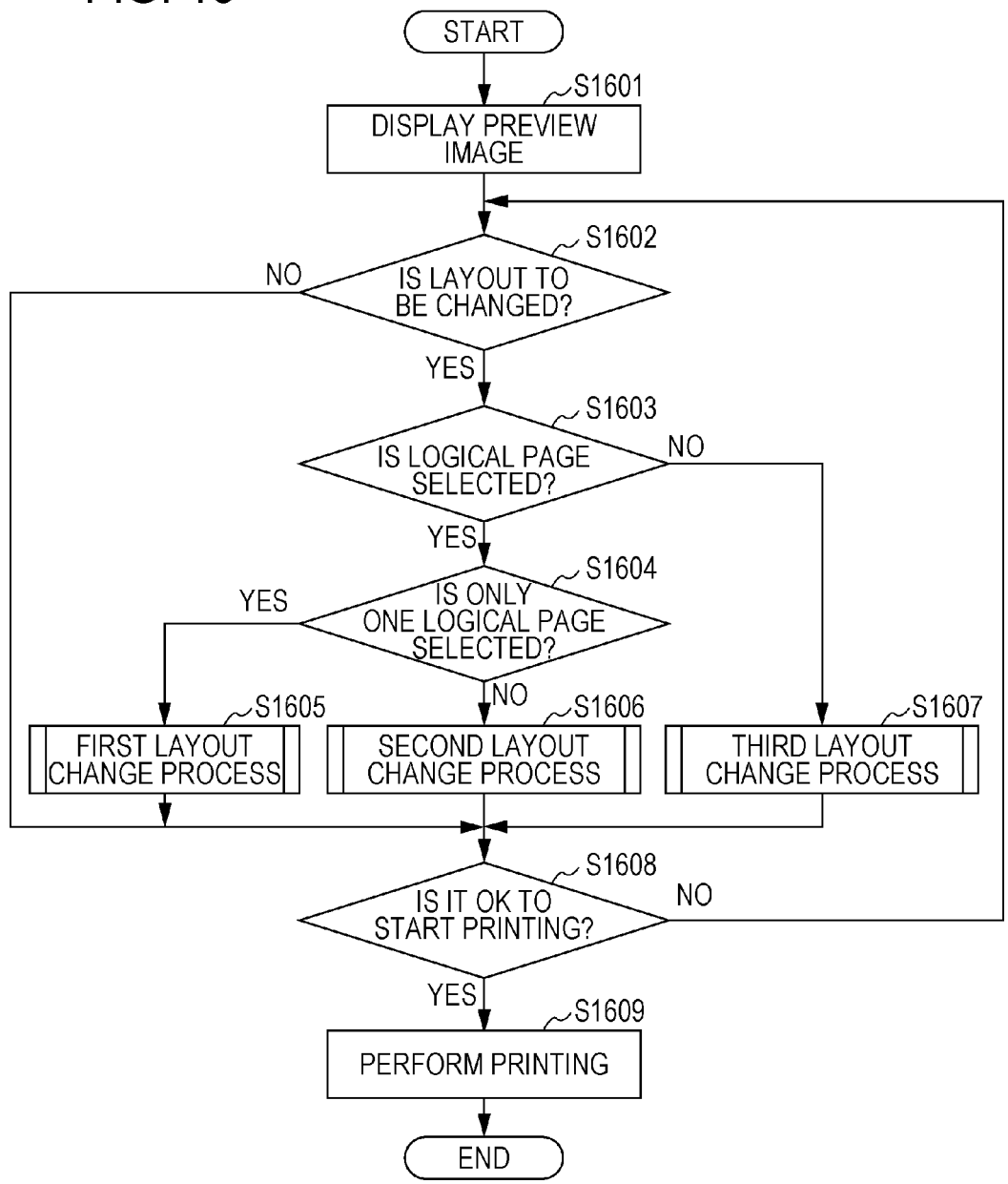

PRINTING APPARATUS, METHOD OF CHANGING LAYOUT, AND STORAGE MEDIUM

BACKGROUND OF THE INVENTION

1. Field of the Invention

The present invention relates to a printing apparatus, a method of changing a layout, and a storage medium.

2. Description of the Related Art

In a printing apparatus such as an MFP (Multi Function Peripheral), a printer, or the like, multipage printing is known to print a plurality of logical pages on a single sheet, which allows a reduction in the number of sheets used for printing. For example, when 2-in-1 is specified in setting of a multipage printing condition, printing is performed such that two logical pages are laid out on one sheet. In a case of 4-in-1, printing is performed such that four logical pages are laid out on one sheet. By printing a plurality of logical pages on one sheet according to the multipage printing condition as described above, it is possible to reduce the number of sheets used in printing.

Regarding the multipage printing, Japanese Patent Laid-Open No. 2005-322040 discloses a technique to set a multipage printing condition separately for each logical page. In the technique disclosed in Japanese Patent Laid-Open No. 2005-322040, for example, when a logical page includes characters with a relatively small size, the logical page is printed in a 1-in-1 layout, while when a logical page includes characters with a relatively large size, the logical page is printed in a 2-in-1 layout thereby achieving both good readability and saving of sheets.

However, in the technique disclosed in Japanese Patent Laid-Open No. 2005-322040, to change a layout such as an order of logical pages, it is necessary to re-generate printing data such that a desirable layout is achieved or it is necessary to specify page numbers such that a desirable layout is achieved.

In view of the above, embodiments of the invention provide a technique to change a layout of logical pages in multipage printing by performing a simple operation without needing a complicated operation.

SUMMARY OF THE INVENTION

According to an aspect, a printing apparatus includes a setting unit configured to set a multipage printing condition in which a plurality of logical pages are printed on a physical page corresponding to a sheet on which printing is actually performed, a display unit configured to display the plurality of logical pages laid out on the physical page according to the multipage printing condition set by the setting unit, an acceptance unit configured to accept a drag operation on a specific one of the logical pages displayed on the display unit, and a changing unit configured to change the layout of logical pages when the specific one of the logical pages is moved by the drag operation, wherein the changing unit makes a determination, based on a destination area to which the specific one of the logical pages is moved, as to whether the specific one of the logical pages is to be inserted on a physical page displayed on the display unit or a new physical page is to be generated and the specific one of the logical pages is to be inserted on the newly generated physical page.

Further features of the present invention will become apparent from the following description of exemplary embodiments with reference to the attached drawings.

BRIEF DESCRIPTION OF THE DRAWINGS

FIGS. 8A to 8D are diagrams illustrating examples of manners of changing a layout according to the first embodiment.

FIG. 16 is a flow chart illustrating a process of changing a layout according to the first embodiment.

DESCRIPTION OF THE EMBODIMENTS

Embodiments are described below with reference to drawings. Note that the following description of the embodiments is not for limiting the scope of the invention. Also note that all elements described in the embodiments are not indispensable to the invention.

First Embodiment

Figure 1:
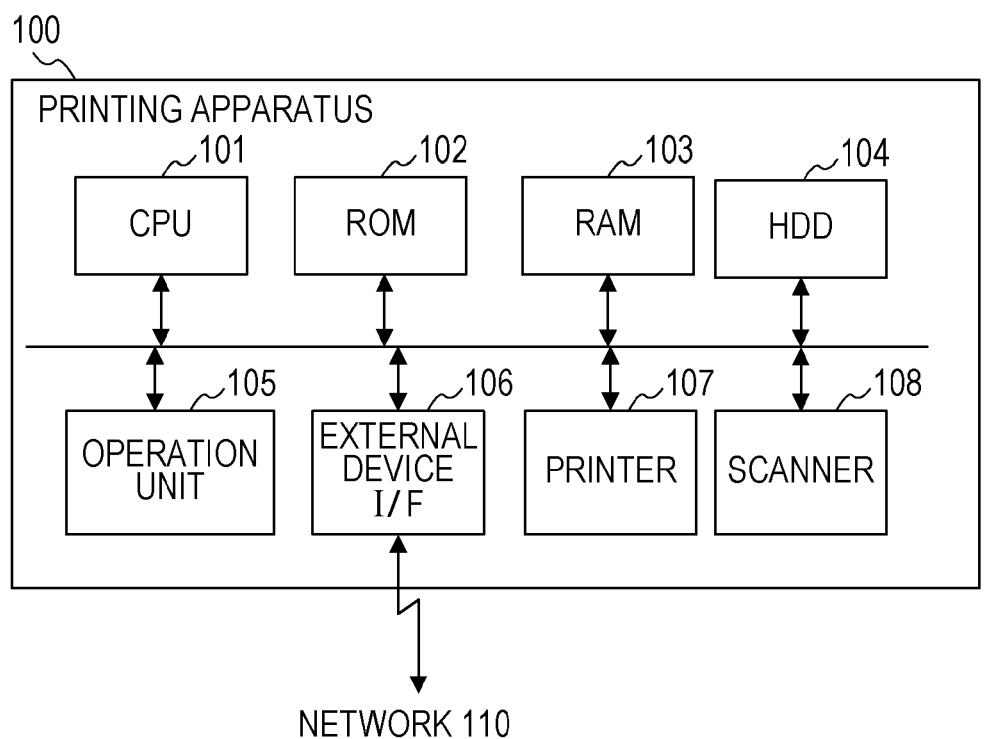
FIG. 1 is a diagram illustrating a structure of a printing apparatus according to a first embodiment.

FIG. 1 is a diagram illustrating a structure of a printing apparatus 100 according to a first embodiment. The printing apparatus is by way of example an MFP. Note that the printing apparatus is not limited to the MFP, but the printing apparatus may be another type of printing apparatus such as an SFP (Single Function Peripheral).

A CPU 101 controls the whole printing apparatus 100 according to a control program read out from a ROM 102 or an HDD 104. The ROM 102 stores information including the control program necessary in executing a process such as that illustrated later with reference to a flow chart. A RAM 103 is used by the CPU 101 as a main memory and a temporary storage area such as a work area. The HDD 104 stores information including the control program, as with the ROM 102.

An operation unit 105 includes a display unit (for example, a liquid crystal display unit having a touch panel function), a keyboard, etc. The operation unit 105 displays various operation screens and transmits information input by a user to the CPU 101.

A scanner 108 scans a document and generates image data thereof. A printer 107 performs a printing process on a sheet according to a command issued by a user via the operation unit 105 or a command input from an external apparatus via an external device interface (I/F) 106.

A communication unit 106 communicates with an external PC (Personal Computer) or a server via a network 110.

Figure 2:
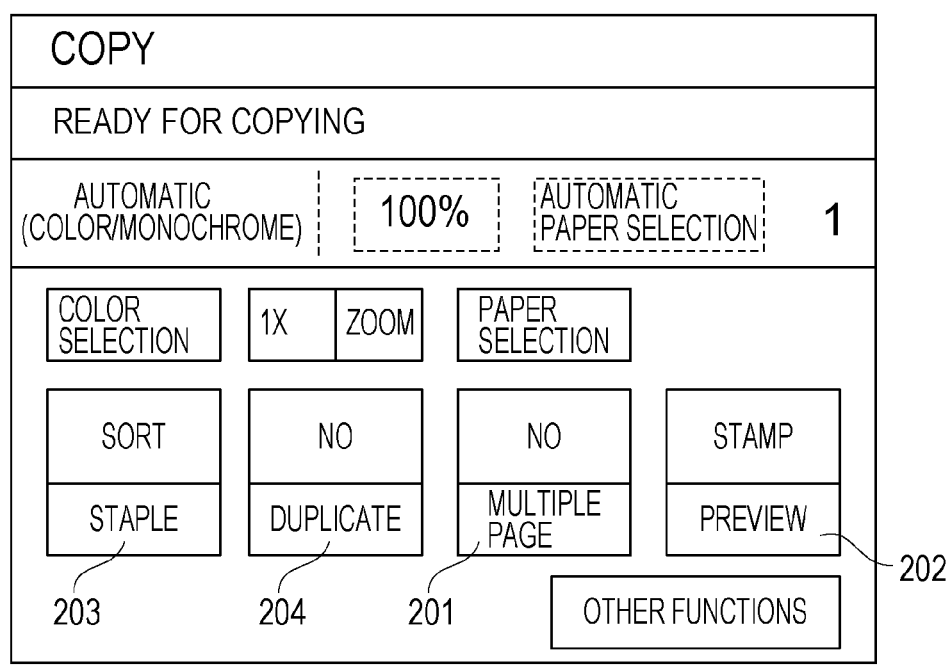
FIG. 2 is a diagram illustrating a copy screen according to the first embodiment.

The present embodiment is described in further detail below in terms of an operation screen used by a user in copying a document and an operation performed by the user. FIG. 2 illustrates a copy screen 200 that is displayed on the operation unit 105 when a copying function of the printing apparatus 100 is executed. Note that the copying function is one of functions executable by the printing apparatus 100. In the present embodiment, the printing apparatus 100 is capable of printing a plurality of pages together on a single sheet in various multiple page layouts such as in a 2-in-1 layout in which two document pages are printed on one sheet, a 4-in-1 layout in which four document pages are printed on one sheet, etc. In the present embodiment, an image of one page of document is referred to as a logical page. In the 2-in-1 layout, two logical pages are printed on one sheet, while in the 4-in-1 layout, four logical pages are printed on one sheet. In the present embodiment, it is possible to perform multipage printing not only in a copy operation, but also in a print operation according to setting of a print job supplied from an external PC or the like.

In the present embodiment, to execute the multipage printing, a user selects a button 201. In response to the selection of the button 201, a multipage printing setting screen 300 (illustrated in FIG. 3) for setting associated with the multipage printing is displayed on the operation unit 105.

The printing apparatus 100 is capable of setting printing conditions including a stapling condition, a duplex printing condition, etc. When a user selects a button 203, an operation screen (not illustrated) for setting associated with stapling is displayed. If a button 204 is selected by a user, an operation screen (not illustrated) for setting associated with duplex printing is displayed.

Figure 3:
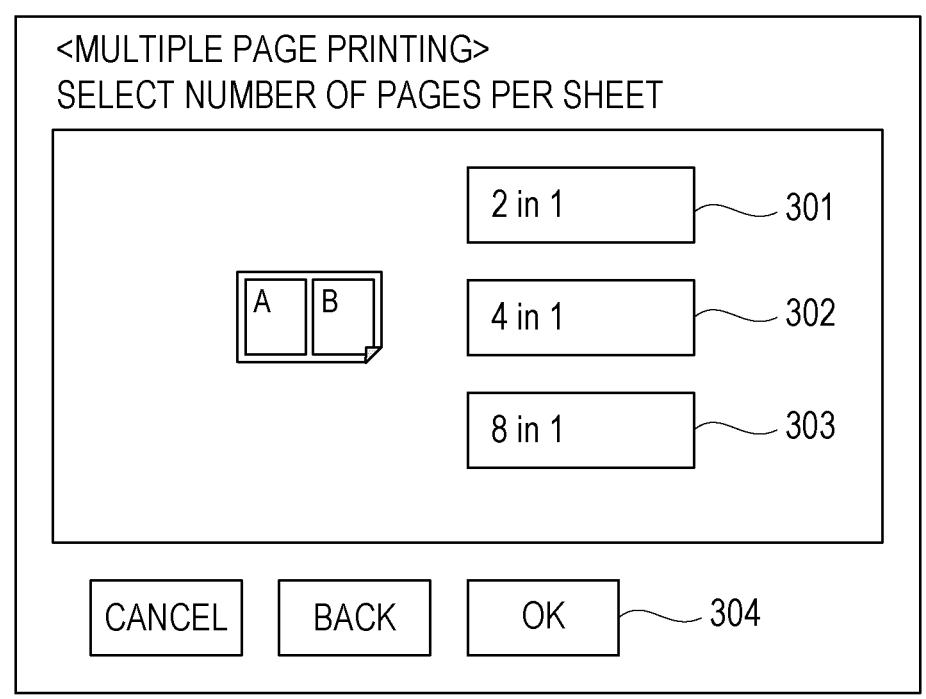
FIG. 3 is a diagram illustrating a multipage printing setting screen according to the first embodiment.

FIG. 3 illustrates a multipage printing setting screen 300 for setting associated with the multipage printing operation in which a plurality of logical pages are printed together on one sheet. In the present embodiment, it is allowed to perform the multiple page printing in a layout selected from a group including a 2-in-1 layout in which two logical pages are printed on one sheet, a 4-in-1 layout in which four logical pages are printed on one sheet, and an 8-in-1 layout in which eight logical pages are printed on one sheet. If a user selects one of buttons 301 to 303 and then presses down an OK button 304, the setting of multiple page printing is complete. After the setting of multiple page printing on the multipage printing setting screen 300 is complete, if a button 202 on the copy screen 200 is pressed, a preview screen 400 (illustrated in FIG. 4) is displayed on the operation unit 105 to provide a preview of the setting of multiple page printing.

Figure 4:
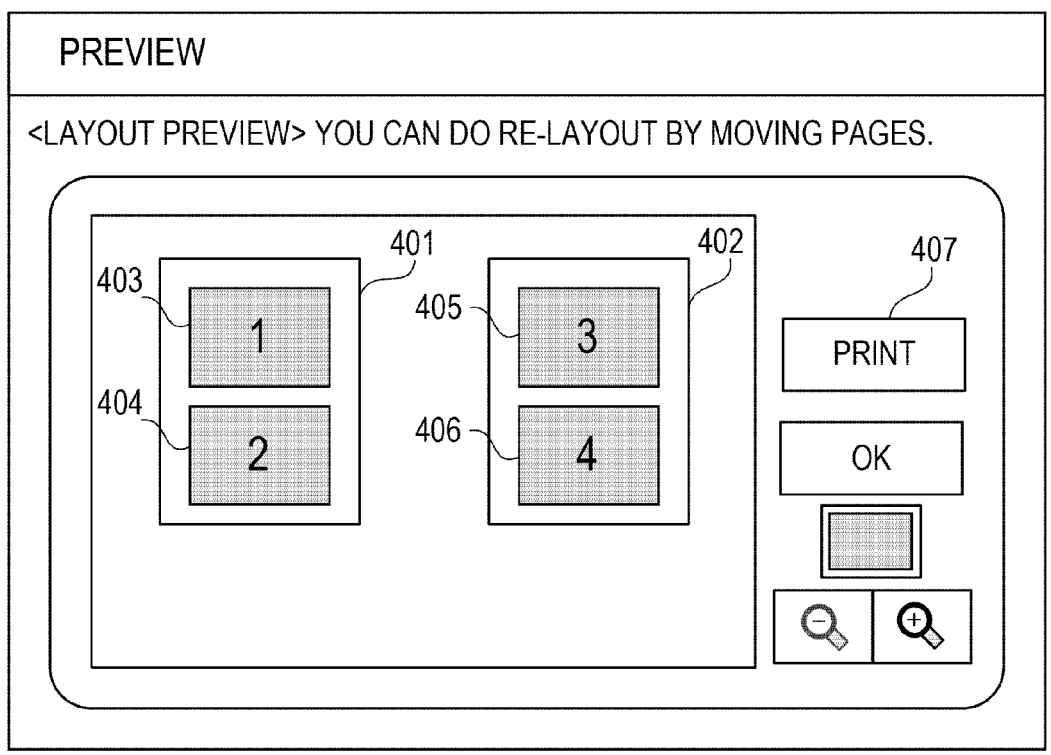
FIG. 4 is a diagram illustrating a preview screen according to the first embodiment.

FIG. 4 illustrates the preview screen 400. In this example, the preview screen 400 displays the preview of printing in the 2-in-1 layout specified by the user by pressing the button 301 on the multipage printing setting screen 300. Note that in the present embodiment, pages corresponding to sheets on which printing is actually performed are referred to as "physical pages". In the example illustrated in FIG. 4, pages 401 and 402 displayed on the preview screen 400 are physical pages, while pages 403 to 406 are logical pages.

The logical pages 403 to 406 are displayed according to image data obtained by scanning documents using the scanner 108 so that a user is allowed to change the layout in many ways while watching the logical pages to be actually printed on sheets as will be described below. Alternatively, instead of using original image data obtained by scanning documents by the scanner 108, the logical pages 403 to 406 but may be displayed using image data produced for use in displaying preview images, such as thumbnail image data. Furthermore, instead of using image data obtained by scanning documents by the scanner 108, other image data may be used in displaying the logical pages 403 to 406. For example, image data stored in the HDD 104 may be used. In this case, the multipage printing is performed using the image data stored in the HDD 104.

In the present embodiment, the operation unit 105 may be configured using a touch panel so as to be capable of accepting operations such as a touch operation, a drag operation, a flick operation, etc., performed by a user. In the present embodiment, however, the configuration of the operation unit 105 is not limited to that using the touch panel, but the operation unit 105 may be configured, for example, to accept an operation using a mouse. In a state in which the logical pages 403 to 406 and the physical pages 401 and 402 are displayed on the preview screen 400 as illustrated in FIG. 4, if a switch button (not illustrated) is touched or a flick operation is performed, other logical pages and other physical pages are displayed. If a print button 407 is touched, printing is performed according to the layout displayed on the preview screen 400.

Next, a description is given below as to a process of changing the layout of logical pages to be printed in the multipage mode using the preview screen 400 according to the present embodiment. Let's us consider a case in which the layout displayed on the preview screen 400 does not meet the intention of a user in that the logical page 404 and the logical page 405 are opposite in location. This may occur, for example, if documents are scanned by the scanner 108 in a wrong order and thus if the logical page 404 and the logical page 405 are opposite to each other in location. In this case, if the documents are scanned again by the scanner 108 in a correct order, then a correct layout intended by the user will be obtained. However, if there are a large number of documents, the re-scanning will take a long time, which will result in a delay in completion of the multipage printing process. The present embodiment provides a method of resolving the above problem.

Figure 5A:
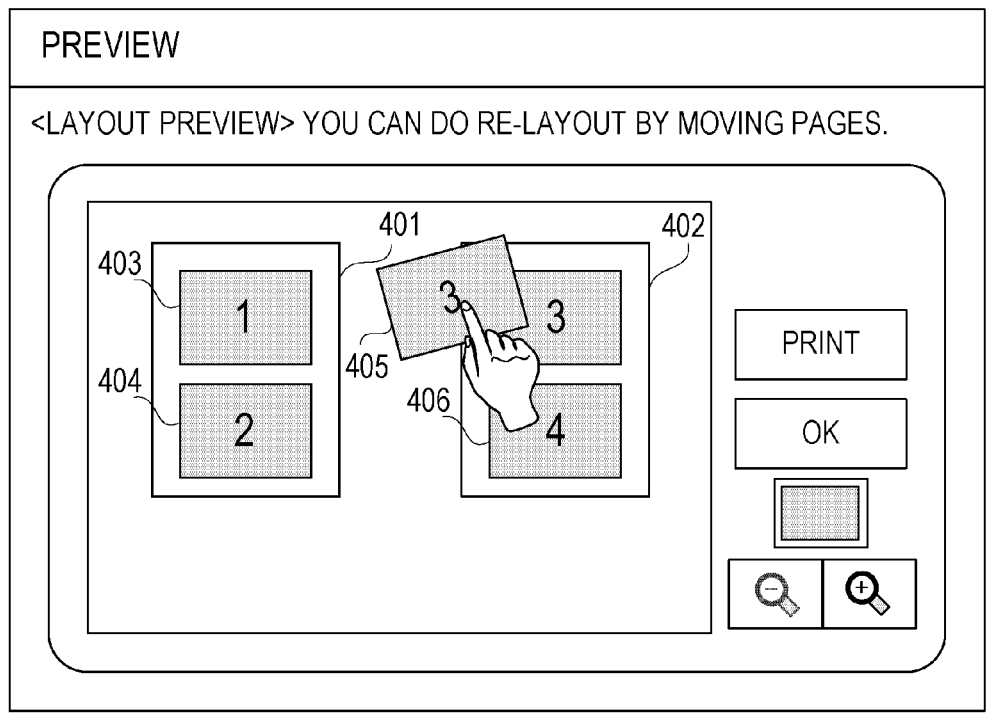
FIGS. 5A and 5B are diagrams illustrating a manner of changing a layout according to the first embodiment.
Figure 5B:
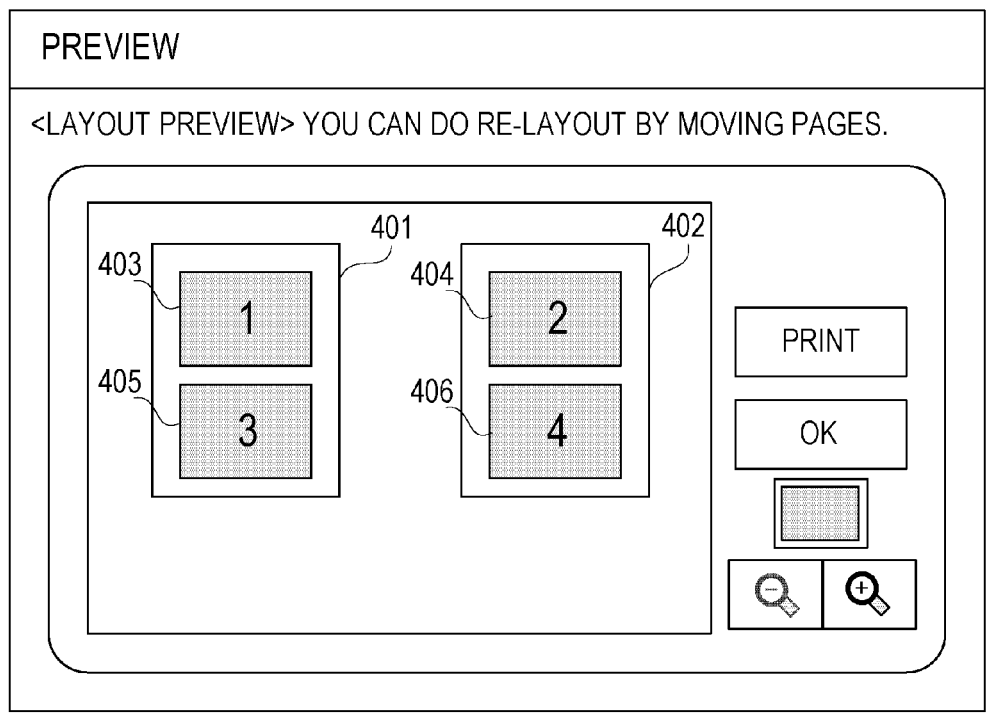

In the preview screen 400, if a user touches a particular logical page, for example, the logical page 405, and drags it, then the logical page 405 moves, for example, as represented on a preview screen 500 illustrated in FIG. 5A. To distinguish a logical page selected by a user from other logical pages, the selected logical page may be displayed in a slanted manner as in the preview screen 500 or may be highlighted in color. If the logical page 405 is dragged into between the logical page 403 and the logical page 404 and then the user's finger is moved away, the logical page 405 is inserted between the logical page 403 and the logical page 404, and thus the layout is changed as represented on the preview screen 510 illustrated in FIG. 5B. As can be seen by comparing the preview screen 510 and the preview screen 400, the logical page 404 and the logical page 405 are replaced by each other in the layout.

A further detailed description is given below as to the operation of moving a logical page by dragging as illustrated above with reference to FIG. 5 and the process of changing the layout based on the destination area to which the logical page is moved.

Figure 6:
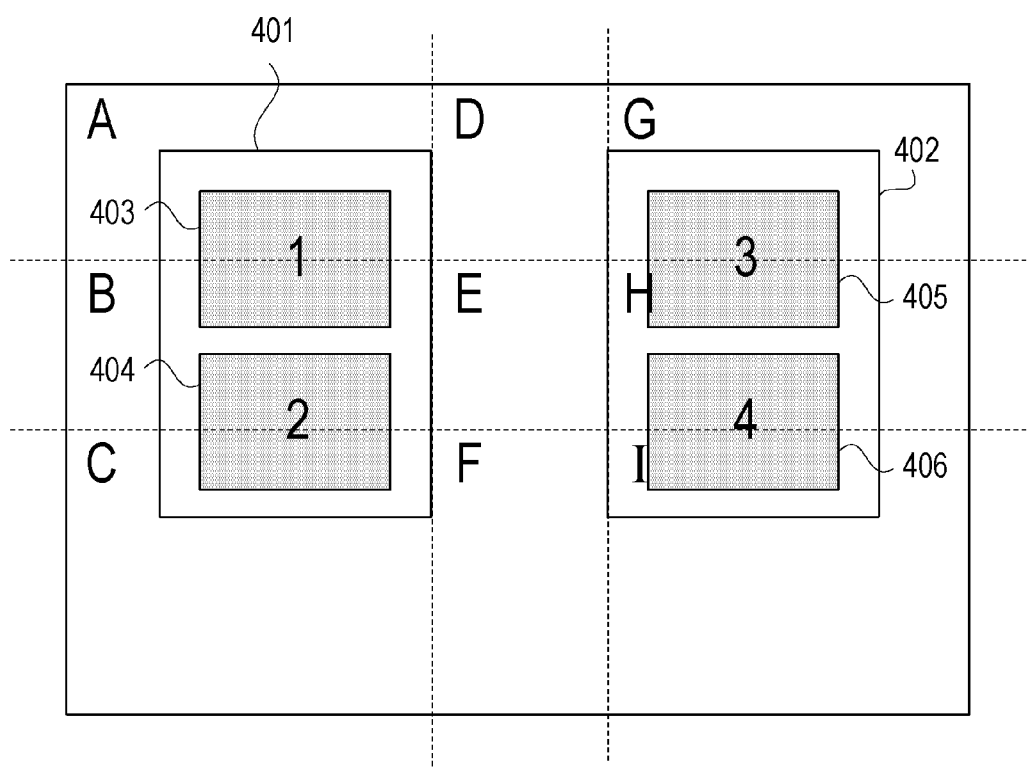
FIG. 6 is a diagram illustrating a manner of dividing an area according to the first embodiment.

FIG. 6 illustrates an example of a layout in which 2-in-1 is set as a multipage printing condition. In the present embodiment, as illustrated in FIG. 6, the total area is divided into nine areas A to I, and the layout is changed depending on a destination area to which a logical page is moved. In the following description, by way of example, it is assumed that a logical page 405 is dragged. In the present embodiment, there are various modes in which the layout is changed, and the mode is determined depending on the destination area to which the logical page 405 is moved.

First, a description is given below as to four modes for a case in which the destination area to which the logical page 405 is moved is one of the areas A to C and G to I.

Mode 1. When the destination area is A, the layout is changed as described below.

Figure 7A:
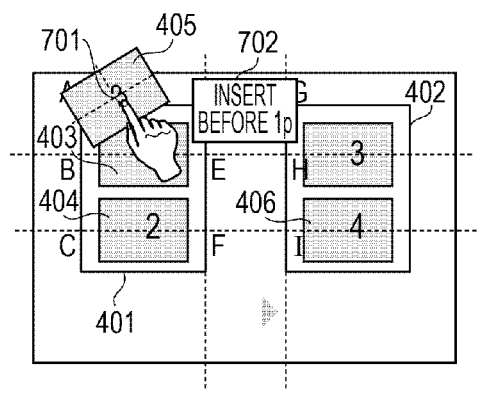
FIGS. 7A to 7D are diagrams illustrating examples of manners of changing a layout according to the first embodiment.

FIG. 7A illustrates a case in which the logical page 405 is moved to the area A. In this case, the logical page 405 is inserted before the logical page 403, i.e., at the top. The destination area to which the logical page 405 has been moved is determined by detecting an area in which a center 701 of the logical page 405 is located. If a user's finger is moved away from the logical page 405 in the area A, the logical page 405 is inserted before the logical page 403 as illustrated in FIG. 8A. In the case where the logical page 405 is dragged in the area A, a message 702 may be displayed to inform that the logical page 405 will be inserted before the logical page 403. This allows a user to know how the layout of logical pages is going to be changed.

Mode 2. When the destination area is B, the layout is changed as described below.

Figure 7B:
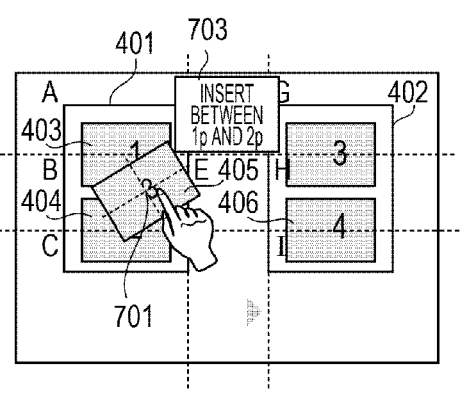

FIG. 7B illustrates a case in which the logical page 405 is moved to the area B. If the user's finger is moved away from the logical page 405 in the area B, the logical page 405 is inserted after the logical page 403 as illustrated in FIG. 8B. In the case where the logical page 405 is dragged in the area B, a message 703 may be displayed to inform that the logical page 405 will be inserted after the logical page 403.

Mode 3. When the destination area is C, G, or H, the layout is changed as described below.

Figure 7C:
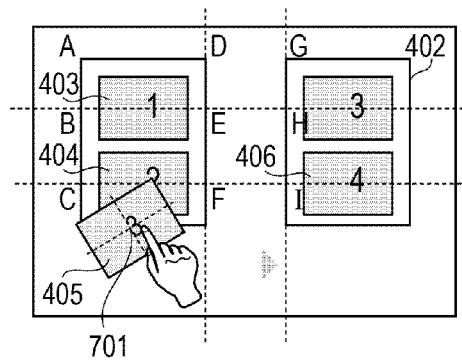

FIG. 7C illustrates a case in which the logical page 405 is dragged to the area C. Because the logical page 405 is located after the logical page 404 in the original layout, when the user's finger is moved away from the logical page 405 in the area C, no change occurs in the layout. Also in a case in which the logical page 405 is dragged to the area G or the area H, no change occurs in the layout.

Mode 4. When the destination area is I, the layout is changed as described below.

Figure 7D:
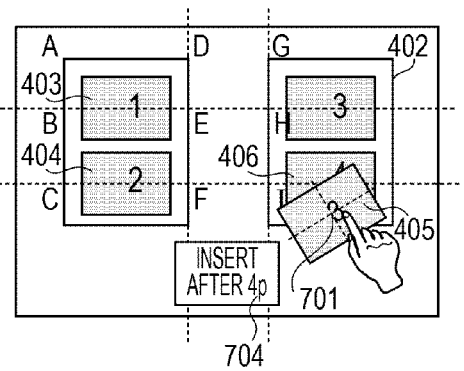

FIG. 7D illustrate a case in which the logical page 405 is dragged to the area I. If the user's finger is moved away from the logical page 405 in the area I, the logical page 405 is inserted after the logical page 406 as illustrated in FIG. 8C. In the case where the logical page 405 is dragged in the area I, a message 704 may be displayed to inform that the logical page 405 will be inserted after the logical page 406.

FIG. 8D illustrates an example of a modification. In the example illustrated in FIG. 8D, information 801 is displayed to indicate an area where the logical page 405 was located in the original layout before it was dragged by a user. Furthermore, a message 802 is displayed to indicate the destination of the logical page 405.

When the destination area to which the logical page 405 is moved is one of the areas D to F, the layout is changed as follows.

Figure 9A:
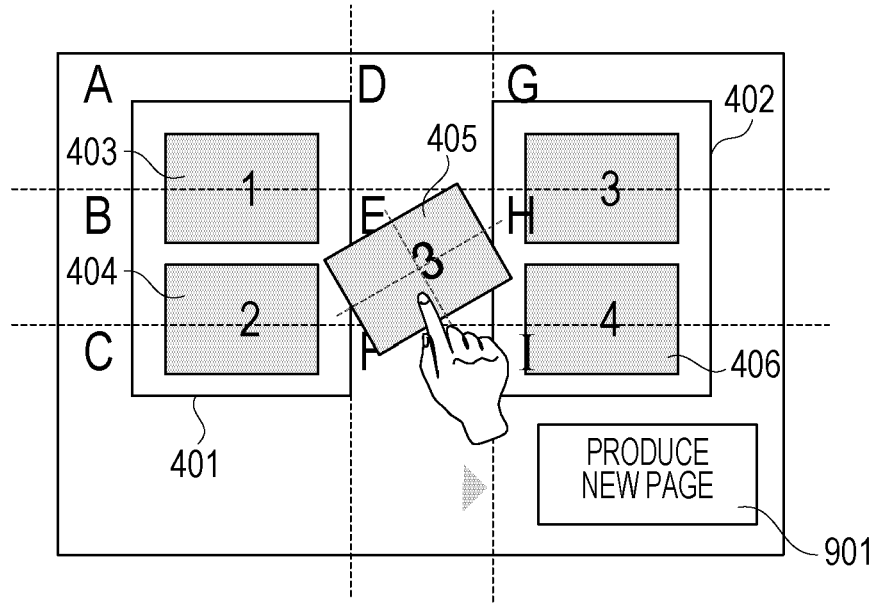
FIGS. 9A and 9B are diagrams illustrating examples of manners of changing a layout according to the first embodiment.

FIG. 9A illustrates a case in which the logical page 405 is dragged to the area E. Also in a case where the logical page 405 is dragged to the area D or the area F, the process is performed in a similar manner to the case where the logical page 405 is dragged to the area E, and thus descriptions are omitted for the case where the logical page 405 is dragged to the area D or the area F. If the logical page 405 is dragged to the area E, a message 901 is displayed to inform a user that a new page (a new physical page) is going to be produced.

Figure 9B:
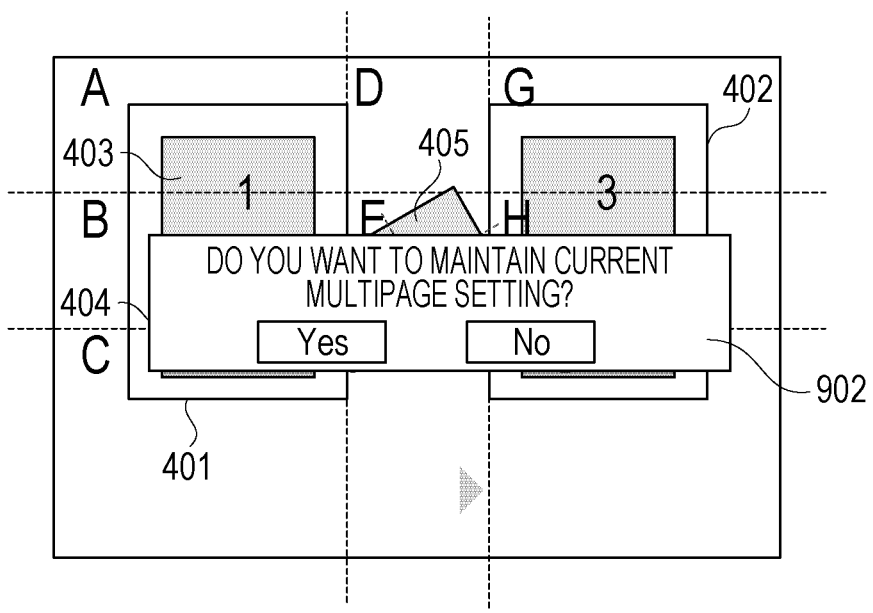
Figure 10A:
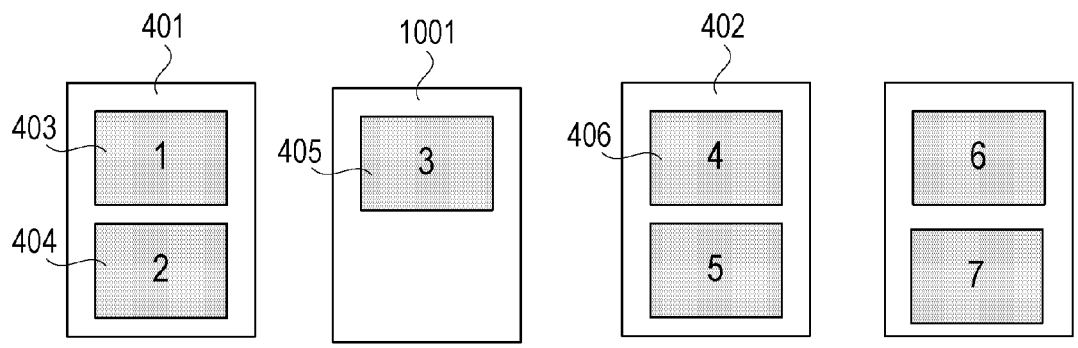
FIGS. 10A and 10B are diagrams illustrating examples of manners of changing a layout according to the first embodiment.

After the logical page 405 is dragged to the area E, if a user's finger is moved away from the logical page 405 in the area E, a message box 902 illustrated in FIG. 9B is displayed to prompt a user to determine whether the current multipage printing condition is maintained when the new page is produced. If the user selects "Yes" in the message box 902, the new page is produce while maintaining the multipage printing condition (the 2-in-1 mode, in this specific example). FIG. 10A illustrates a resultant layout. A physical page 1001 is a physical page newly produced when the logical page 405 is dragged to the area E. In this specific case, because the multipage printing condition is maintained according to the determination performed by the user in the message box 902, the 2-in-1 layout is employed. Thus, in the case where the new physical page is produced while maintaining the multipage printing, all logical pages are laid out in the same layout as described above.

Figure 10B:
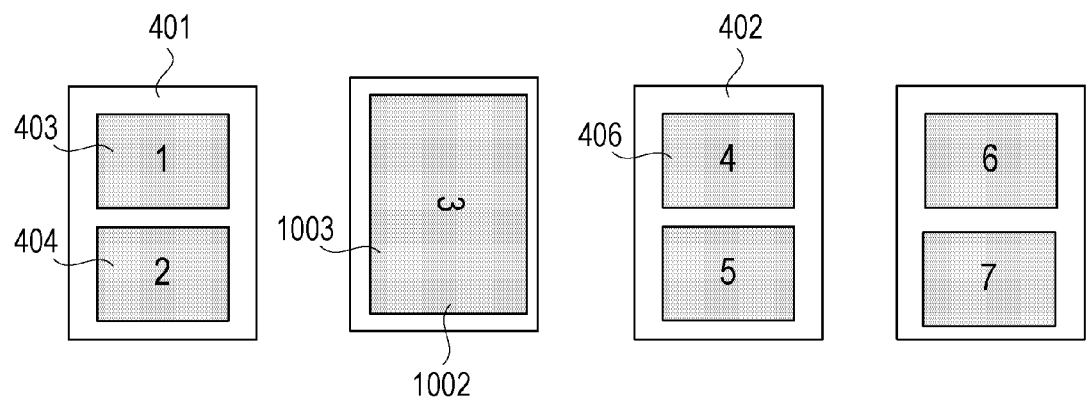

On the other hand, in a case where the user selects "No" in the message box 902, the multipage printing condition is cancelled, and then a new page is produced. FIG. 10B illustrates a resultant layout. A physical page 1002 denotes a physical page produced newly when the logical page 405 is dragged to the area E. In this case, the 1-in-1 layout is employed because the multipage printing setting is not maintained according to the determination made by the user in the message box 902. Thus, a logical page 1003 is formed by placing the logical page 405 in the 1-in-1 layout in which the logical page 405 is rotated in a clockwise direction. By cancelling the multipage printing condition and employing the 1-in-1 layout, it becomes possible to make the best use of the area of physical page 1002.

In a case where as a result of the cancelling of the multipage printing condition, it becomes necessary to rotate a logical page, a user may select whether the rotation is made in the clockwise or counterclockwise direction, or a direction may be determined in advance and registered in the printing apparatus 100. Alternatively, once a user selects the clockwise direction or the counterclockwise direction, the rotation may be performed in the same direction as the selected direction for any following logical page which needs rotation.

In the present embodiment, as described above, when a new physical page is produced, a user selects whether the multipage printing condition is maintained or not. Alternatively, setting as to whether the multipage printing condition is maintained or not may be registered in advance in the printing apparatus 100.

In the examples described above, a user drags a logical page to change the layout. Alternatively, a physical page may be dragged to change the order of physical pages as described in detail below with reference to FIG. 11. In the present embodiment, because logical pages are laid out on each physical page, a change in the order of physical pages results in a change in the layout of logical pages.

Figure 11A:
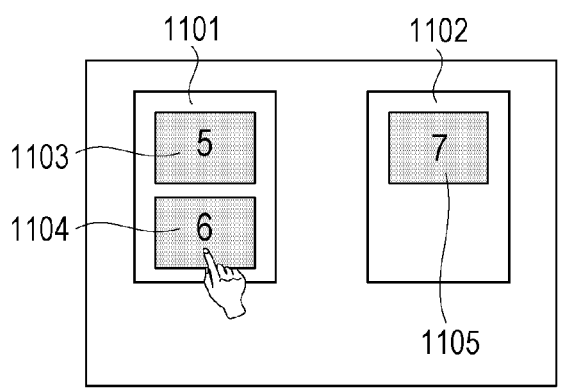
FIGS. 11A to 11C are diagrams illustrating examples of manners of changing a layout according to the first embodiment.

FIG. 11A illustrates part of a preview screen that is displayed on the operation unit 105 when the 2-in-1 layout is selected as the multipage printing condition. In FIG. 11A, only a partial area including a physical page 1101 and a physical page 1102 is displayed although there are other physical pages arranged in the set multipage printing condition. A logical page 1103 and a logical page 1104 are laid out on the physical page 1101, while a logical page 1105 is laid out on the physical page 1102.

There is a difference in a manner of selection between a logical page and a physical page, as described below. In the selection of a logical page described above, the logical page to be selected is touched with a finger. On the other hand, to select a physical page according to the present embodiment, the physical page to be selected is touched and then maintained in the touched state for a period of time equal to or longer than a predetermined value. The CPU 101 of the printing apparatus 100 measures the time during which the touch panel of the operation unit 105 is continuously touched by a user. If a user touches, for example, a logical page 1103 and if the length of the touch period is less than the predetermined value, it is determined that the logical page 1103 is selected. On other hand, if a user touches, for example, a physical page 1101 and touching is maintained for a period equal to or longer than the predetermined value, it is determined that the physical page 1101 is selected. Note that when a user touches a logical page 1103 or a logical page 1104 continuously over a period equal to or longer than the predetermined value, the CPU 101 regards this operation as being performed to select the physical page 1101.

Figure 11B:
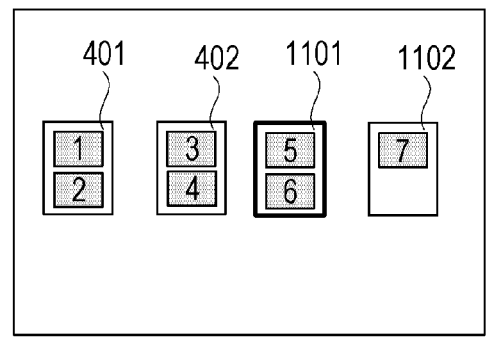

When the physical page 1101 in FIG. 11A is selected by a user, a preview screen illustrated in FIG. 11B is displayed on the operation unit 105. In FIG. 11B, as can be seen, the display area is expanded such that the whole layout area is displayed and thus a user is allowed to easily change the order of physical pages. The physical page 1101 selected by the user is highlighted such that the user is allowed to distinguish it from the other physical pages. In the present embodiment, the physical page 1101 is highlighted by representing the frame thereof with a thick line. Alternatively, the selected physical page may be highlighted by being colored, popped up, or in other ways.

Figure 11C:
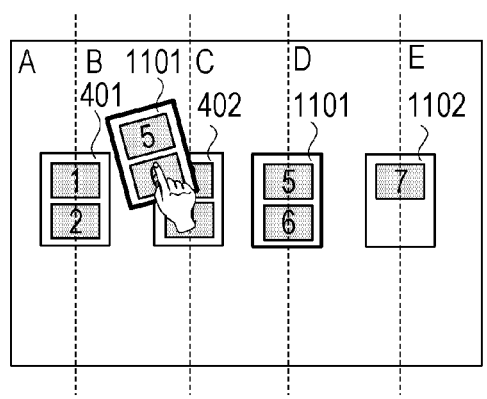

In FIG. 11B, after the physical page 1101 is dragged to a particular area, if the user's finger is moved away from the physical page 1101 in this particular area, the physical page 1101 is moved to that area and thus the order of physical pages is changed. The change in the order of physical pages is described in further detail below with reference to FIG. 11C. In the present embodiment, the total area is divided as illustrated in FIG. 11C depending on the number of physical pages, and the order of physical pages is changed depending on an area to which the physical page is moved. In the example illustrated in FIG. 11C, there are four physical pages and thus the total area is divided into five areas.

Figure 12A:
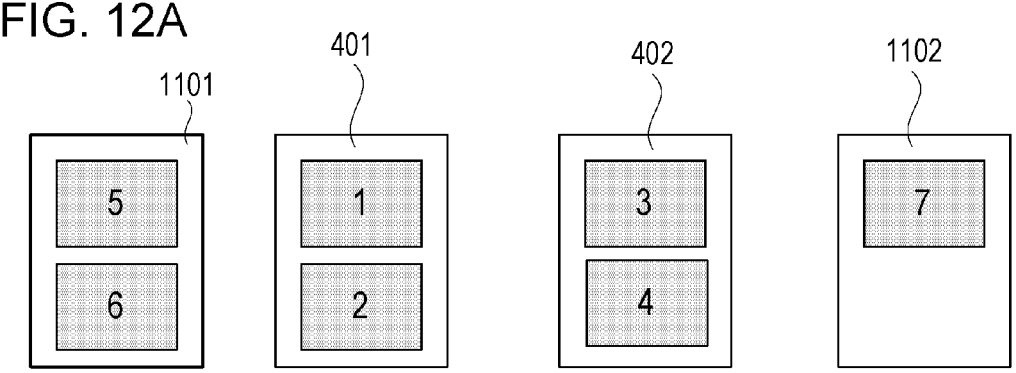
FIGS. 12A to 12C are diagrams illustrating examples of manners of changing a layout according to the first embodiment.
Figure 12B:
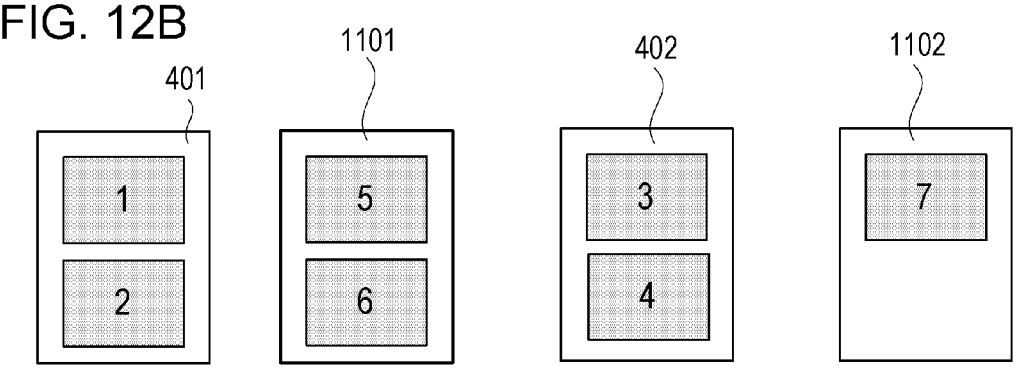

After the physical page 1101 is dragged to an area A, if the user's finger is moved away from the physical page 1101 in the area A, the physical page 1101 is moved to a location before the physical page 401 and thus the order of physical pages is changed as illustrated in FIG. 12A. In a case where the physical page 1101 is dragged to an area B and then the user's finger is moved away from the physical page 1101, the physical page 1101 is moved into between the physical page 401 and the physical page 402, and thus the order of physical pages is changed as illustrated in FIG. 12B.

In a case where the physical page 1101 is dragged to an area C or an area D and then the user's finger is moved away from the physical page 1101, the physical page 1101 is not moved and thus the order of physical pages is not changed.

Figure 12C:
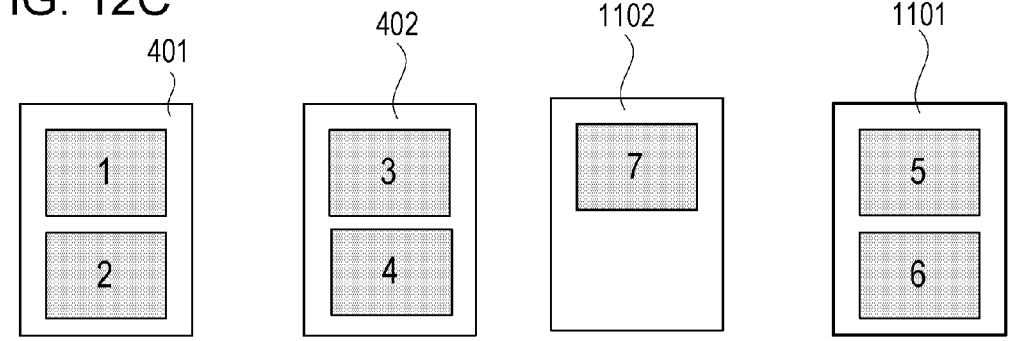

In a case where the physical page 1101 is dragged to an area E and then the user's finger is moved away from the physical page 1101 in the area E, the physical page 1101 is moved to a location after the physical page 1102 and thus the order of physical pages is changed as illustrated in FIG. 12C.

In the above description with reference to FIG. 11B, the display area is expanded when a physical page is selected. The display area may also be expanded when a logical page is selected and dragged. After a physical page or a logical page is moved in the expanded displayed area in such a manner as illustrated in FIG. 11b, the display may be returned into a previous state as illustrated in FIG. 11A when the movement is complete.

In the present embodiment, another way of changing the layout is to drag two logical pages as described below.

Figure 13:
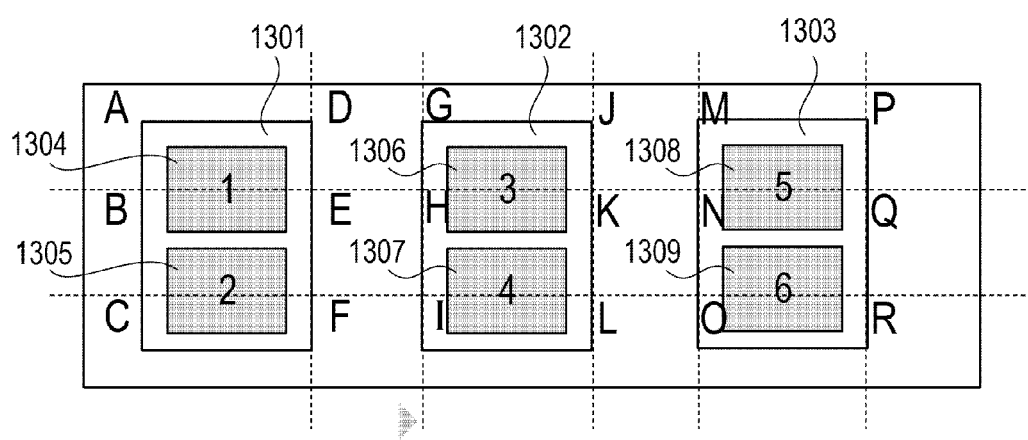
FIG. 13 is a diagram illustrating a manner of dividing an area according to the first embodiment.

FIG. 13 illustrates a layout, displayed on the operation unit 105, in which 2-in-1 is selected as the multipage printing condition. In FIG. 13, three physical pages including a physical page 1301, a physical page 1302, and a physical page 1303 are displayed and logical pages 1304 to 1309 are arranged on the physical pages such that two logical pages are laid out on each physical page. In the example illustrated in FIG. 13, the total display area is divided into 18 areas A to R, and the layout of the logical pages is changed based on an area to which a logical page is dragged. Referring to FIGS. 14A to 14D and FIGS. 15A to 15D, a description is given below as to three modes in which two logical pages, i.e., a logical page 1305 and a logical page 1306 are dragged.

Mode 1. When each of the two logical pages is moved to one of areas A to C, G to I, and M to O, the layout is changed as described below.

Figure 14A:
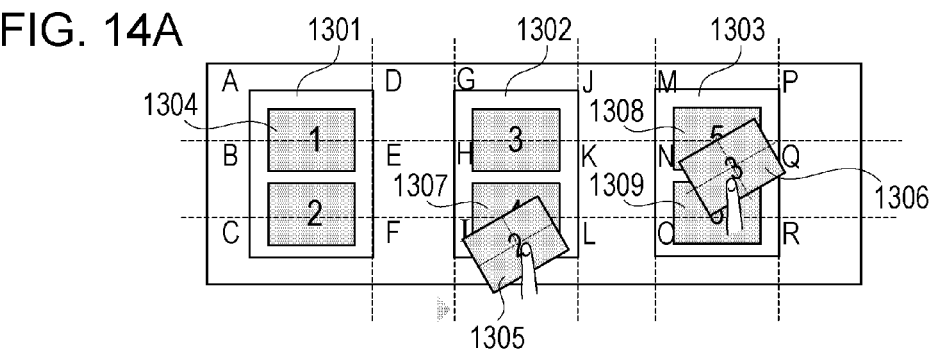
FIGS. 14A to 14D are diagrams illustrating examples of manners of changing a layout according to the first embodiment.
Figure 15A:
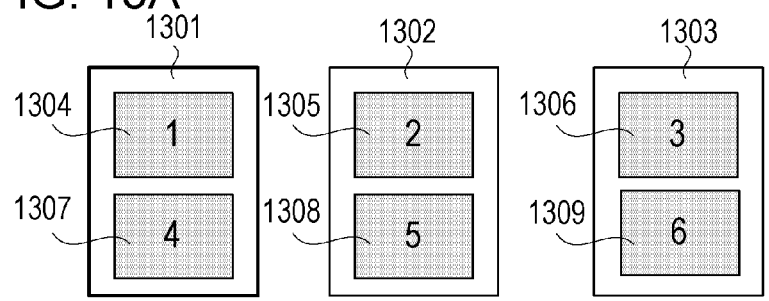
FIGS. 15A to 15D are diagrams illustrating examples of manners of changing a layout according to the first embodiment.

FIG. 14A illustrates a case in which the logical page 1305 is dragged to the area I and the logical page 1306 is dragged to the area N. As a result, the logical pages 1305 and 1306 are inserted into dragged locations. That is, in the example illustrated in FIG. 14A, the logical page 1305 is inserted after the logical page 1307 and the logical page 1306 is inserted after the logical page 1308. After the logical page 1305 is dragged into the area I and the logical page 1306 is dragged into the area N, if the user's fingers are moved away, the layout of the logical pages is changed as illustrated in FIG. 15A.

Mode 2. When one logical page is moved into one of areas A to C, G to I, and M to O, and another logical page is moved into one of area D to F, J to L, and P to R, the layout is changed as described below.

Figure 14B:
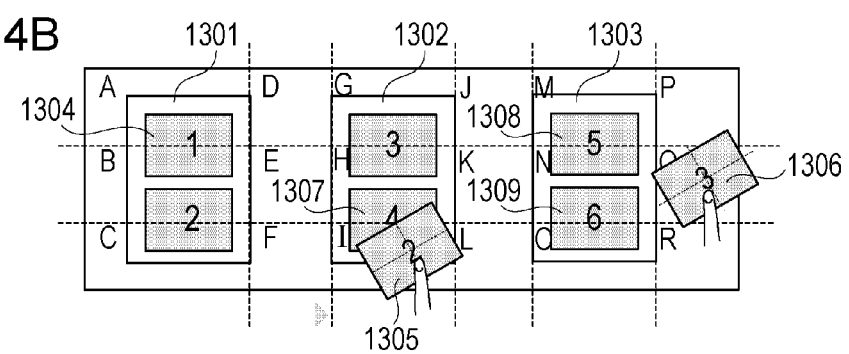
Figure 15B:
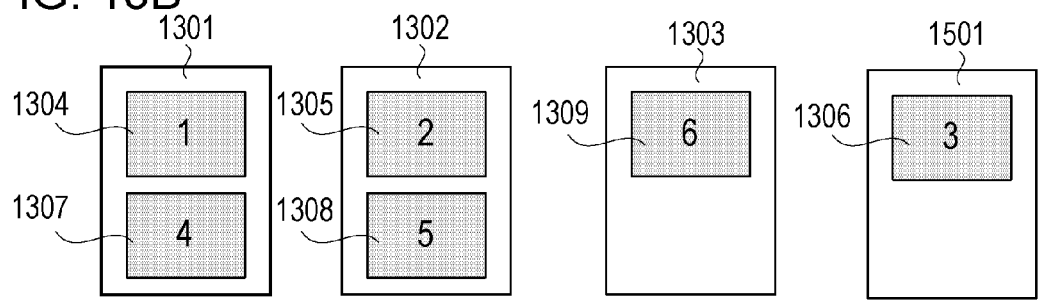

FIG. 14B illustrates a case in which the logical page 1305 is dragged to the area I and the logical page 1306 is dragged to the area Q. In this case, the logical page 1305 is inserted at a location after the logical page 1307, and a new physical page is generated at a location after the physical page 1303. After the logical page 1305 is dragged into the area I and the logical page 1306 is dragged to the area Q, if the user's fingers are moved away, the layout of the logical pages is changed as illustrated in FIG. 15B. In FIG. 15B a physical page 1501 denotes the newly generated physical page.

Mode 3. When each of the two logical pages is moved to one of areas D to F, J to L, and P to R, the layout is changed as described below.

Figure 14C:
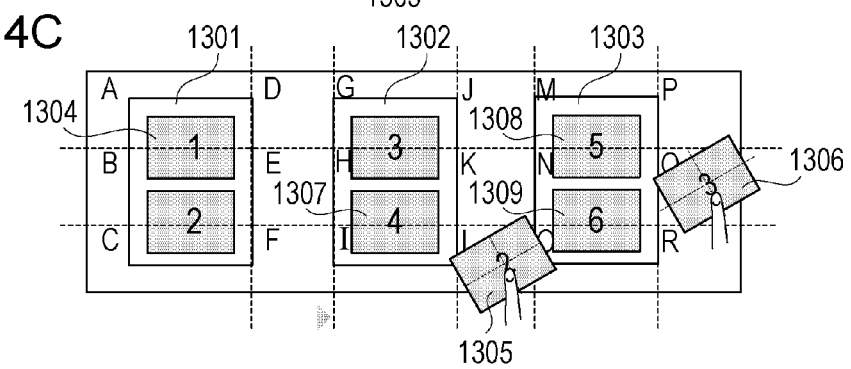
Figure 15C:
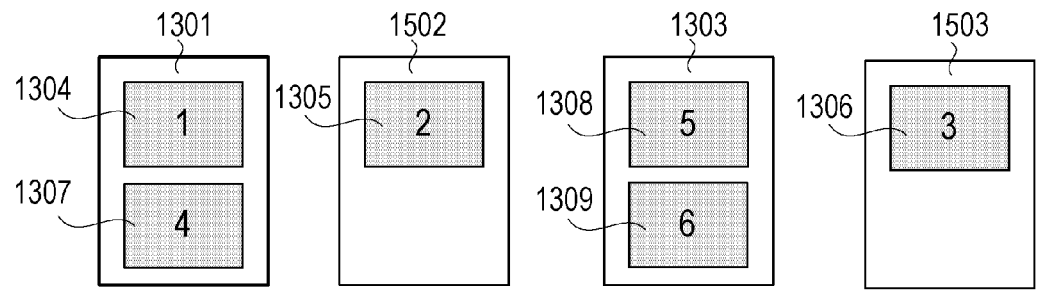

FIG. 14C illustrates a case in which the logical page 1305 is dragged to the area L and the logical page 1306 is dragged to the area Q. As illustrated in FIG. 14C, new physical pages are produced at respective locations after the physical page 1302 and the physical page 1303. After the logical page 1305 is dragged to the area L and the logical page 1306 is dragged to the area Q, if the user's fingers are moved away, the layout of the logical pages is changed as illustrated in FIG. 15C. In FIG. 15C, physical pages 1502 and 1503 respectively denote newly generated physical pages. When new physical pages are generated, a message box 902 such as that illustrated in FIG. 9B may be displayed to prompt a user to determine whether the multipage printing condition is maintained.

Figure 14D:
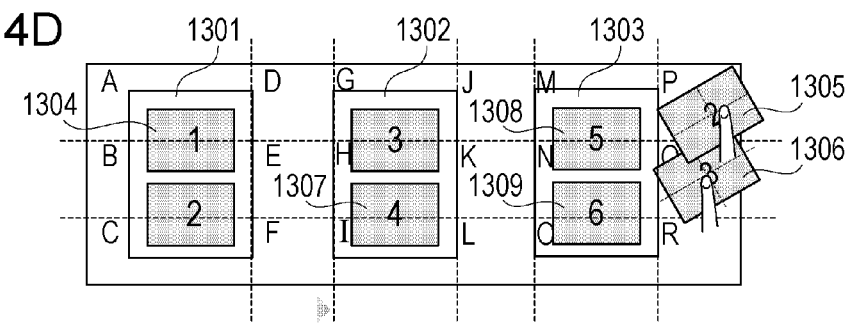
Figure 15D:
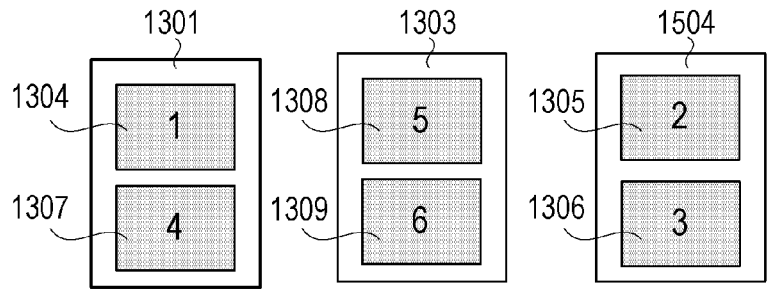

FIG. 14D illustrates a case in which the logical page 1305 is dragged to the area P and the logical page 1306 is dragged to the area Q. In the present embodiment, although areas P, Q, and R are managed as different areas, these areas P, Q, and R are regarded as belonging to a single area when the layout of logical pages is changed. Similarly, the areas D, E, and F are regarded as belonging to a single area, and the areas J, K, and L are regarded as belonging to a single area. In FIG. 14D, a new physical page is generated at a location after the physical page 1303, and the logical page 1305 and the logical page 1306 are put in the 2-in-1 layout. After the logical page 1305 is dragged to the area P and the logical page 1306 is dragged to the area Q, if the user's fingers are moved away, the layout of the logical pages is changed as illustrated in FIG. 15D. In FIG. 15D, a physical page 1504 denotes a newly generated physical page.

The process of changing the layout of logical pages according to the present embodiment is described in further detail with reference to a flow chart illustrated in FIG. 16. Steps S1601 to S1608 in FIG. 16 are performed by the CPU 101 of the printing apparatus 100 by executing a program loaded into the RAM 103 from a memory such as the ROM 102.

After a user sets the multipage printing condition in the multipage printing setting screen 300 illustrated in FIG. 3, if the user presses the button 202 in the copy screen 200 illustrated in FIG. 2, then in step S1601, a preview screen is displayed on the operation unit 105 to provide a preview of a layout according to the multipage printing condition. The preview screen displayed in this step is, for example, the preview screen 400 illustrated in FIG. 4, and a user is allowed to change the layout in a desirable way by selecting and dragging a physical page or a logical page.

Next, in step S1602, the CPU 101 determines whether to change the layout of multipage printing. In the present embodiment, if a user selects a physical page or a logical page by touching it with a finger on the preview screen 400, the CPU 101 determines that the layout is to be changed and the CPU 101 advances the process to step S1603. However, in a case where the CPU 101 determines that the layout is not to be changed, the process proceeds to step S1608.

Next, in step S1603, a determination is performed as to whether the page touched by the user on the preview screen 400, i.e., the page selected by the user is a logical page or not. In the present embodiment, as described above with reference to FIGS. 11A to 11C, the determination as to whether the selected page is a logical page or a physical page is made based on whether the length of a period of time during which the page is continuously touched is equal to or greater than the predetermined value. More specifically, for example, in a case where the logical page 403 on the preview screen 400 is touched by a user and the length of the touch period is less than the predetermined value, the CPU 101 determines that the logical page 403 is selected by the user. On the other hand, in a case where the logical page 403 or 404 on the preview screen 400 is touched by a user over a period with a length equal to or greater than the predetermined value, the CPU 101 determines that the physical page 401 is selected by the user. If the determination by the CPU 101 in step S1603 is that a logical page is selected by a user, then the process proceeds to step S1604, but in a case where the determination by the CPU 101 is that a physical page is selected by the user, then the process proceeds to step S1607.

In a case where a logical page is selected by the user, then in step S1604 the CPU 101 determines whether the number of logical pages selected by the user is one or two.

In a case where the determination in step S1604 by the CPU 101 is that the number of logical pages selected by the user is one, the process proceeds to step S1605 in which the CPU 101 performs a first layout change process such that the layout of logical pages is changed based on a destination of the one logical page. The first layout change process will be described in further detail later with reference to a flow chart illustrated in FIG. 17. If the first layout change process performed by the CPU 101 in step S1605 is complete, the process proceeds to step S1608.

In a case where the determination in step S1604 by the CPU 101 is that the number of logical pages selected by the user is two, the process proceeds to step S1606 in which performs a second layout change process such that the layout of logical pages is changed based on destinations of the two logical pages. The second layout change process will be described in further detail later with reference to a flow chart illustrated in FIG. 18. If the second layout change process performed by the CPU 101 in step S1606 is complete, the process proceeds to step S1608.

In a case where the determination in step 1603 by the CPU 101 is that a physical page is selected by the user, then the process proceeds to step S1607. In step S1607, the CPU 101 performs a third layout change process such that the order of physical pages is changed based on a destination of the physical page. The third layout change process will be described in further detail later with reference to a flow chart illustrated in FIG. 19. If the third layout change process performed by the CPU 101 in step S1607 is complete, the process proceeds to step S1608.

Next, in step S1608, the CPU 101 determines whether to perform printing according to the multipage printing condition defined on the multipage printing setting screen 300 or according to the layout of logical pages finally defined via the layout change process. More specifically, for example, if a user touches a print button 407 on the preview screen 400 or presses a hardware key serving as a print button (not illustrated), the CPU 101 determines that printing is to be performed and the CPU 101 advances the process to step S1609. On the other hand, in a case where the CPU 101 determines that printing is not to be performed, the process returns to step S1602.

In step S1609, the printer 107 performs printing according to the multipage printing condition defined on the multipage printing setting screen 300 or according to the layout of logical pages finally defined via the layout change process.

Figure 17:
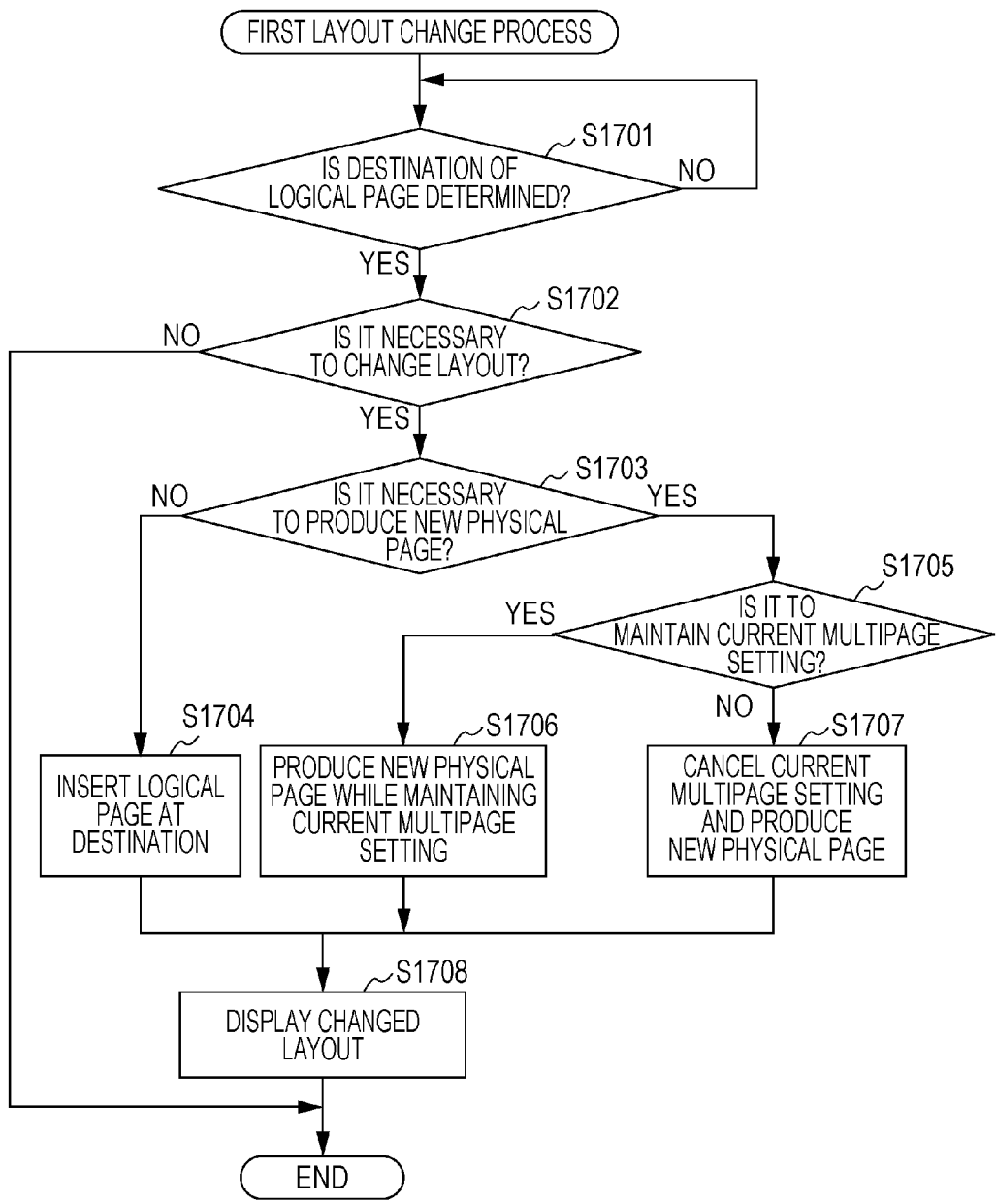
FIG. 17 is a flow chart illustrating a first layout change process according to the first embodiment.

Next, the first layout change process in step S1605 in FIG. 16 is described in further detail with reference to the flow chart illustrated in FIG. 17. Steps S1701 to S1708 in FIG. 17 are performed by the CPU 101 of the printing apparatus 100 by executing a program loaded into the RAM 103 from a memory such as the ROM 102.

As described above with reference to FIGS. 7A to 7D or FIGS. 9A and 9B, the first layout change process is a process of changing the layout of logical pages depending on a destination of one logical page moved by a user by dragging. First, in step S1701, the CPU 101 determines whether the destination of the logical page is finally determined. In the present embodiment, when a user moves his/her finger away from a logical page touched and dragged, the destination of the logical page is finally determined. If the CPU 101 determines that the destination of the logical page is finally determined, the process proceeds to step S1702. However, in a case where it is determined that the destination of the logical page is not yet determined, the CPU 101 waits in step S1701 until the destination of the logical page is finally determined.

Next, in step S1702, the CPU 101 determines, based on the destination area to which the logical page is to be moved, whether it is necessary to change the layout of logical pages. The determination in step S1702 is described in further detail with reference to FIG. 6. In FIG. 6, when a user drags the logical page 405 to change the layout of logical pages, if the user's finger is moved away from the logical page 405 in the area C, G, or H, no actual change occurs in the layout of logical page 405, and thus the CPU 101 determines that it is not necessary to change the layout of logical pages and the CPU 101 ends the first layout change process. On the other hand, when the user's finger is moved away from the logical page 405 in an area other than the areas C, G, and H, a change occurs in the layout of logical page 405, and thus the CPU 101 determines that it is necessary to change the layout of logical pages and the CPU 101 advances the process to step S1703.

Next, in step S1703, the CPU 101 determines, based on the destination area to which the logical page is to be moved, whether it is necessary to generate a new physical page. More specifically, in FIG. 6, the destination of the logical page is one of areas A to C and areas G to I, the CPU 101 determines that it is not necessary to generate a new physical page and the CPU 101 advances the process to step S1704. On the other hand, in a case where the destination area of the logical page is one of areas D to F, the CPU 101 determines that it is necessary to generate a new physical page and the CPU 101 advances the process to step S1705.

In step S1704, the CPU 101 inserts the logical page, dragged by the user, in the destination area. In the case where the logical page 405 is dragged to the area B as illustrated in FIG. 7B, the logical page 405 is inserted into between the logical page 403 and the logical page 404, and thus the layout is changed as illustrated in FIG. 8B. If the layout is changed, then in step S1708 the changed layout of logical pages is displayed on the operation unit 105 as illustrated in the preview screen 400.

Next, the process in step S1705 is described. In step S1705, the CPU 101 determines whether the set multipage printing condition is to be maintained when the new physical page is generated. More specifically, the message box 902 illustrated in FIG. 9B is displayed to prompt a user to select whether the multipage printing condition is maintained. If the user selects Yes in the message box 902, then in step S1705 the CPU 101 determines that the multipage printing condition is to be maintained, and the CPU 101 advances the process to step S1706. On the other hand, in a case where the user selects No in the message box 902, then in step S1705 the CPU 101 determines that the multipage printing condition is not to be maintained, and the CPU 101 advances the process to step S1707.

Next, the process in step S1706 is described. In step S1706, the CPU 101 generates a new physical page in the specified destination area and puts the logical page dragged by the user on this new physical page while maintaining the multipage printing condition in the layout of logical pages. More specifically, for example, when the 2-in-1 layout is specified as the multipage printing condition, the logical page is put on the newly generated physical page in the 2-in-1 layout as with the layout of the physical page 1001 illustrated in FIG. 10A. By generating the new physical page while maintaining the multipage printing condition, it is possible to achieve unification in layout for all logical pages. After the new physical page is generated, in step S1708 the operation unit 105 displays the changed layout of logical pages.

Next, the process in step S1707 is described. In step S1707, the CPU 101 generates a new physical page in the specified destination area and puts the logical page dragged by the user on this new physical page such that the set multipage printing condition is discarded in the layout of logical pages. More specifically, for example, even when the 2-in-1 layout is specified as the multipage printing condition, the logical page is put on the newly generated physical page not in the 2-in-1 layout but in the 1-in-1 layout as with the layout of the physical page 1002 illustrated in FIG. 10B. By discarding the set multipage printing condition in the layout of logical pages as described above, it becomes possible to make the best use of a physical page area. After the new physical page is generated, in step S1708, the changed layout is displayed on the operation unit 105 as illustrated in the preview screen 400. When the set multipage printing condition is cancelled for a newly generated physical page, the multipage printing condition may also be cancelled for other physical pages.

Figure 18:
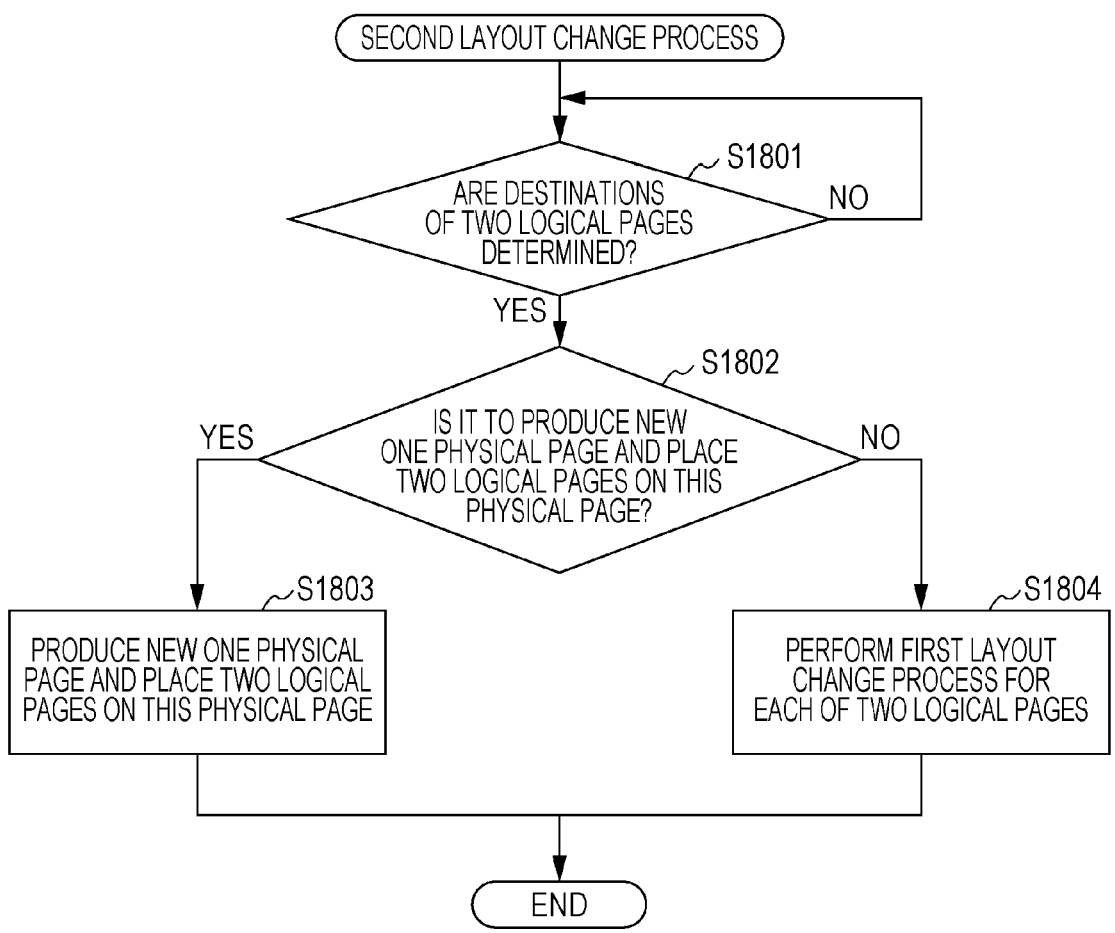
FIG. 18 is a flow chart illustrating a second layout change process according to the first embodiment.

Next, the second layout change process in step S1606 in FIG. 16 is described in detail with reference to the flow chart illustrated in FIG. 18. Steps S1801 to S1811 in FIG. 18 are performed by the CPU 101 of the printing apparatus 100 by executing a program loaded into the RAM 103 from a memory such as the ROM 102.

As described above with reference to FIGS. 14A to 14D, the second layout change process is a process of changing the layout of logical pages depending on destinations of two logical pages dragged by a user. First, in step S1801, a determination is performed as to whether the destinations of the two logical pages are finally determined. In the present embodiment, when a user moves his/her fingers away from logical pages touched and dragged, the destinations of the two logical pages are finally determined. If the CPU 101 determines that the destinations of the logical pages are finally determined, the CPU 101 advances the process to step S1802. However, in a case where it is determined that the destinations of the logical pages are not yet determined, the CPU 101 waits in step S1801 until the destinations of the logical pages are finally determined.

Next, in step S1802, the CPU 101 determines whether to newly generate one physical page to lay the two logical pages thereon. For example, in a case where two logical pages are moved to the area P, Q, or R as illustrated in FIG. 14D, the CPU 101 determines that one physical page is to be newly generated and the two logical pages are to be laid out on the newly generated one physical page, and the CPU 101 advances the process to step S1803. On the other hand, in the case of FIG. 14A, 14B, or 14C, the CPU 101 determines in step S1802 that one physical page is not to be newly generated for laying the two logical pages thereon, and the CPU 101 advances the process to step S1804.

Next, the process in step S1803 is described. In step S1803, the CPU 101 generates a new physical page in the specified destination area of the two logical pages and puts the two logical pages according to the multipage printing condition. More specifically, for example, in the case where the logical pages 1305 and 1306 are respectively dragged to the areas P and Q as illustrated in FIG. 14D, the physical page 1504 is newly generated and the logical pages 1305 and 1306 are laid out on this physical page 1504 in the 2-in-1 layout pattern as illustrated in FIG. 15D. If the layout of logical pages is changed, the operation unit 105 displays the changed layout of logical pages.

Next, the process in step S1804 is described. In step S1804, the CPU 101 performs the first layout change process on each of the two logical pages. The first layout change process has been described above with reference to FIG. 17, and thus a further description thereof is omitted.

Figure 19:
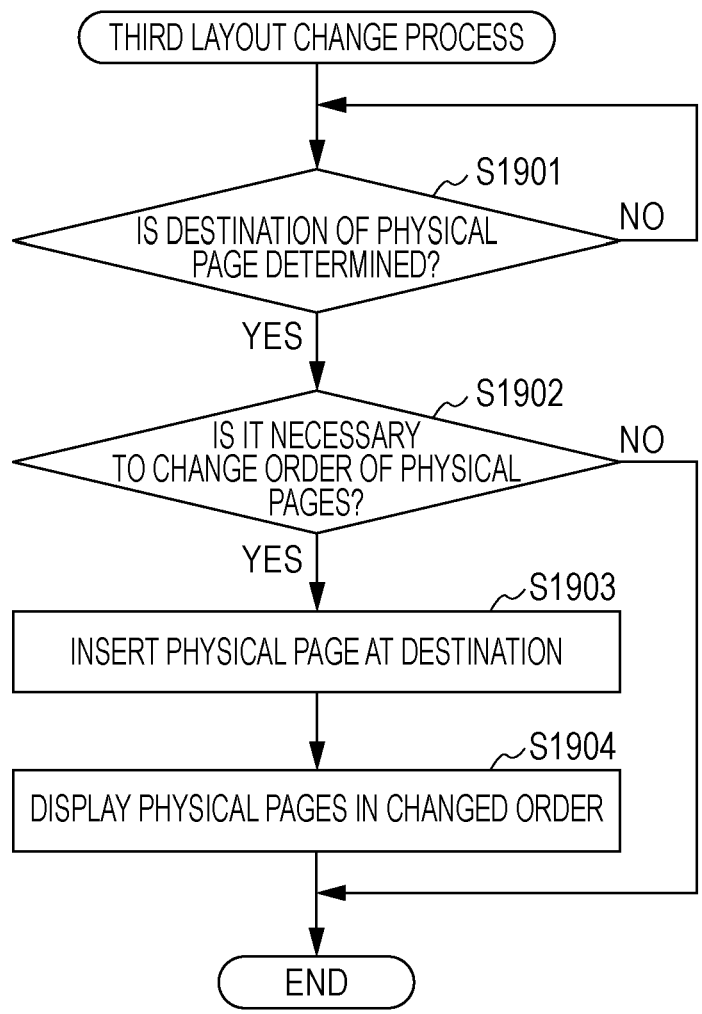
FIG. 19 is a flow chart illustrating a third layout change process according to the first embodiment.

Next, the third layout change process in step S1607 in FIG. 16 is described in detail with reference to the flow chart illustrated in FIG. 19. Steps S1901 to S1903 in FIG. 19 are performed by the CPU 101 of the printing apparatus 100 by executing a program loaded into the RAM 103 from a memory such as the ROM 102.

As described above with reference to FIGS. 11A to 11C, the third layout change process is a process of changing the order of physical pages depending on a destination of a physical page dragged by a user. First, in step S1901, the CPU 101 determines whether the destination of the logical page is finally determined. In the present embodiment, when a user moves his/her finger away from a physical page touched and dragged, the destination of the physical page is finally determined. If the CPU 101 determines in step S1901 that the destination of the logical page is finally determined, the CPU 101 advances the process to step S1902. However, in a case where it is determined that the destination of the physical page is not yet finally determined, the CPU 101 waits in step S1901 until the destination of the physical page is finally determined.

Next, in step S1902, the CPU 101 determines, based on the destination area to which the physical page is to be moved, whether it is necessary to change the order of physical pages. The determination in step S1902 is described in further detail below with reference to FIG. 11C. Let it be assumed herein that a user drags a physical page 1101 in FIG. 11C. If the user's finger is moved away from the physical page 1101 in the area C or D, no change occurs in the order of physical pages, and thus the CPU 101 determines that it is not necessary to change the order of physical pages and the CPU 101 ends the third layout change process. On the other hand, in a case where the user's finger is moved away from the physical page 1101 in the area A, B, or E, a change occurs in the order of physical pages, and thus the CPU 101 determines that it is necessary to change the order of physical pages and the CPU 101 advances the process to step S1903.

Next, the process in step S1903 is described. In step S1903, the CPU 101 inserts the physical page in the destination area. More specifically, in a case where the physical page 1101 is dragged to the area B as illustrated in FIG. 11C and then the user's finger is moved away from the physical page 1101 in the area B, the CPU 101 inserts the physical page 1101 into between the physical page 401 and the physical page 402. If the order of layout of physical pages is changed in step S1903, then in step S1904, the operation unit 105 displays the physical pages in the changed order.

In the present embodiment, as described above, a user is allowed to change the layout of logical pages based on the multipage printing condition simply by dragging a logical page or a physical page. That is, the user is allowed to change the layout of logical pages by performing a simple process without having to perform a complicated operation via a dedicated setting screen or the like.

Second Embodiment

In the first layout change process according to the first embodiment described above, in a case where a logical page is moved, for example, to one of the areas A to C or G to I in FIG. 6, the layout of logical pages is changed such that the logical page is inserted in the specified destination area. That is, in the first layout change process according to the first embodiment, the logical page insertion is performed without changing the multipage printing condition. In a second embodiment described below, in contrast, in addition to inserting a logical page, the multipage printing condition may be changed.

The process of changing the layout of logical pages according to the present embodiment is described below with reference to FIGS. 20A to 20D and FIGS. 21A to 21C.

Figure 20A:
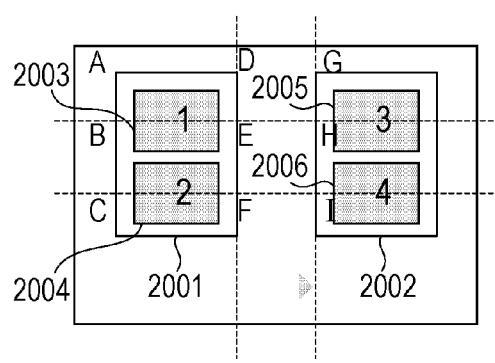
FIGS. 20A to 20D are diagrams illustrating examples of manners of changing a layout according to a second embodiment.
Figure 21A:
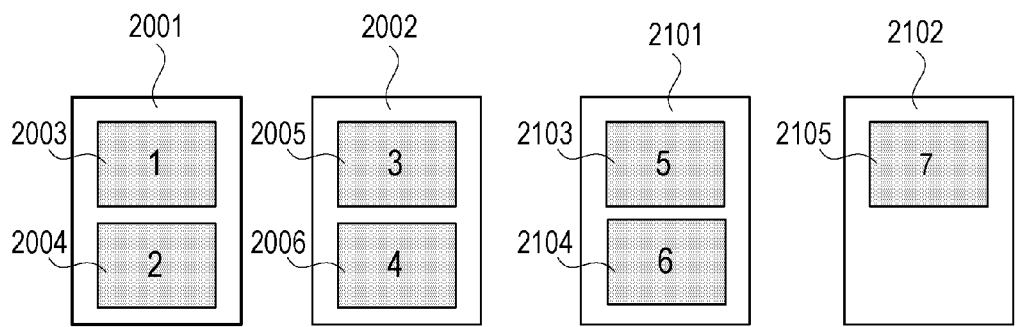
FIGS. 21A to 21C are diagrams illustrating examples of manners of changing a layout according to the second embodiment.

FIG. 20A illustrates part of a preview screen that is displayed on the operation unit 105 when the 2-in-1 layout is selected in the multipage printing setting screen 300 and the button 202 in the copy screen 200 is further pressed. In FIG. 20A, a physical page 2001 and a physical page 2002 are displayed. A logical page 2003 and a logical page 2004 are laid out on the physical page 2001, while a logical page 2005 and a logical page 2006 are laid out on the physical page 2002. FIG. 21A illustrates the whole layout when the preview screen illustrated in FIG. 20A is displayed on the operation unit 105.

Figure 20B:
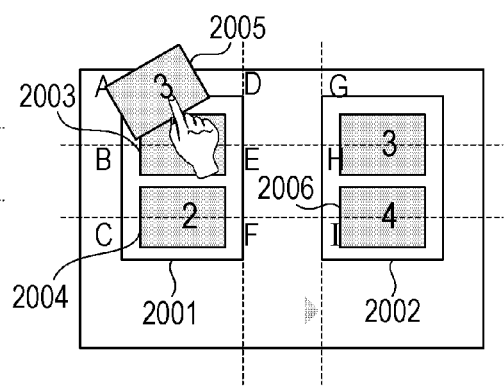
Figure 20C:
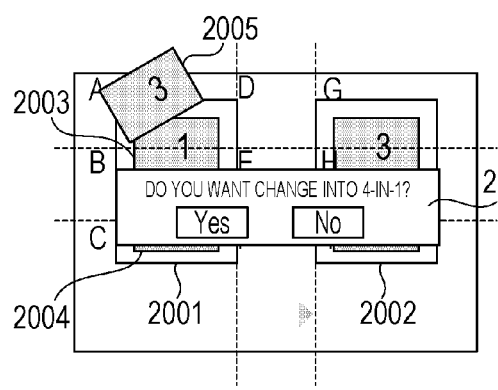

FIG. 20B illustrates a case where a logical page 2005 is touched by a user and dragged to an area A. If the user's finger is moved away from the logical page 2005 in the area A, then a message box 2007 is displayed as illustrated in FIG. 20C to prompt the user to select whether the multipage printing condition is changed from the current setting. Note that the message box 2007 is displayed when the maximum number of logical pages allowed in the multipage printing condition are already present on the physical page selected as the destination of the logical page.

Figure 21B:
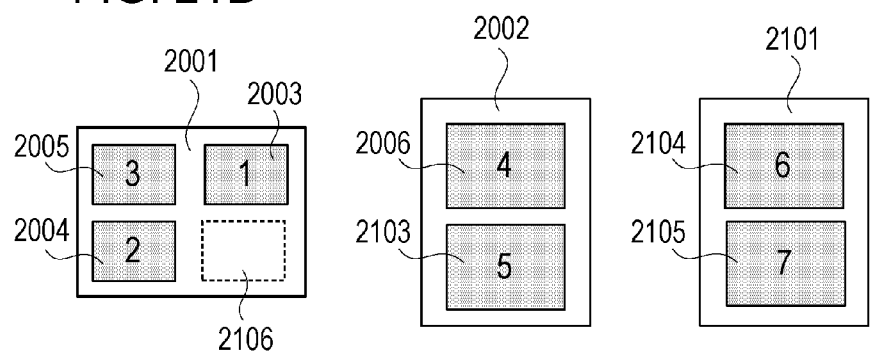

If the user selects "No" in the message box 2007, the logical page 2005 is inserted before the logical page 2003 while maintaining the 2-in-1 layout as in the same manner as in the first embodiment described above. However, if the user selects "Yes" in the message box 2007, the multipage printing condition is changed from 2-in-1 to 4-in-1, and the logical page 2005 is inserted before the logical page 2003. In this case, the whole layout is as illustrated in FIG. 21B. In the case where the multipage printing condition is changed from 2-in-1 to 4-in-1, the logical page 2005 selected by the user is laid out together with the logical pages 2003 and 2004 on the same physical page as illustrated in FIG. 21B.

In this example, a blank area 2106 occurs, although other layouts including no blank area may be employed. For example, a user may select whether a blank area such as the area 2106 is allowed to be present in the layout. Alternatively, logical pages may be laid out such that no blank area such as the blank area 2106 occurs.

Figure 20D:
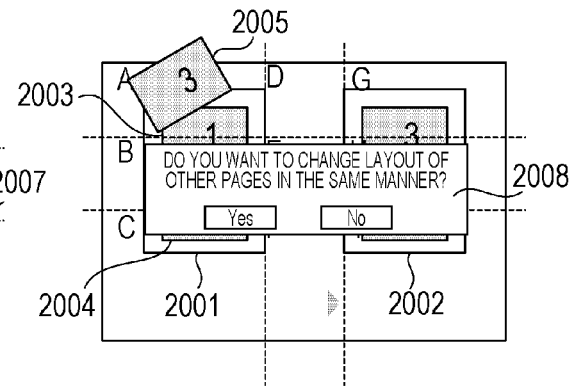
Figure 21C:
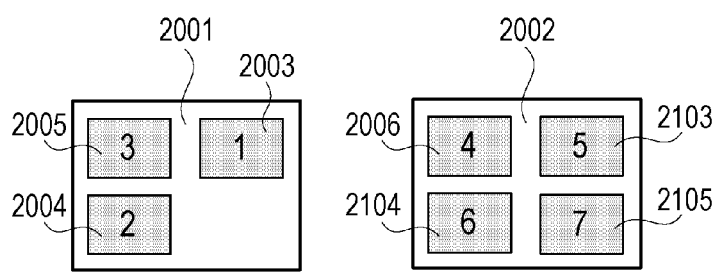

Furthermore, in the present embodiment, in a case where the multipage printing condition is changed for a physical page selected as the destination of a logical page, the change may also be applied to other physical pages. More specifically, in a case where a user selects "Yes" in the message box 2007, a message box 2008 illustrated in FIG. 20D is displayed to prompt the user to select whether the change in the multipage printing condition is also applied to other physical pages. In a case where the user selects "Yes" in the message box 2008, the multipage printing condition is changed from 2-in-1 to 4-in-1 not only for the physical page 2001 but for all other physical pages. In this case, the whole layout is as illustrated in FIG. 21C. On the other hand, if the user selects "No" in the message box 2008, the multipage printing condition is changed from 2-in-1 to 4-in-1 only for the physical page 2001. In this case, the whole layout is as illustrated in FIG. 21B.

Although in the present embodiment, when the multipage printing condition is changed for a physical page selected as the destination of a logical page, a user is allowed to select whether the change is also applied to other physical pages, the selection may be performed in other ways. For example, the selection as to whether the change in the multipage printing condition is also applied to other physical pages may be made in advance and may be registered in the printing apparatus 100.

Figure 22:
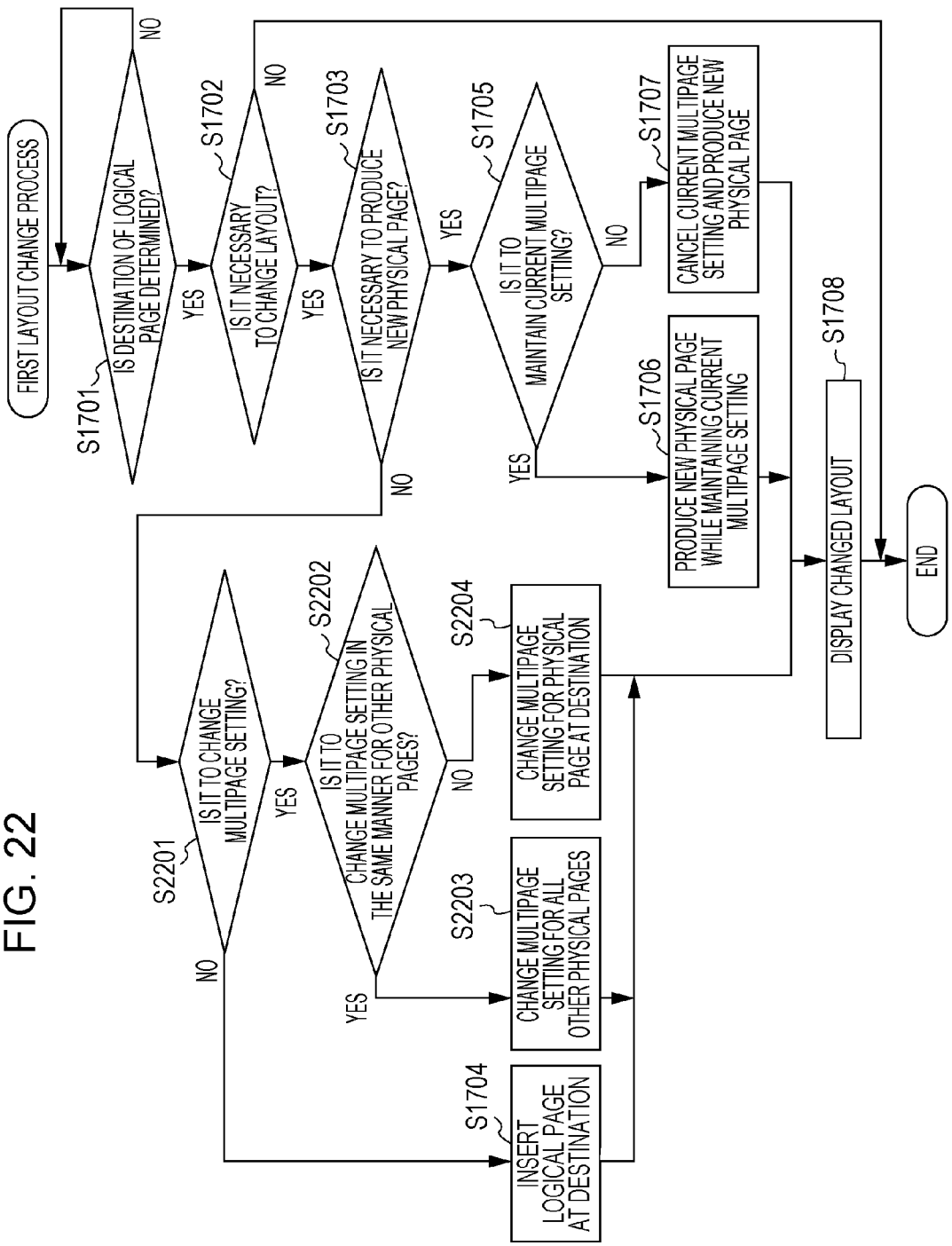
FIG. 22 is a flow chart illustrating a first layout change process according to the second embodiment.

The first layout change process according to the present embodiment is described in detail with reference to a flow chart illustrated in FIG. 22. Steps in FIG. 22 are performed by the CPU 101 of the printing apparatus 100 by executing a program loaded into the RAM 103 from a memory such as the ROM 102. Steps with the same step numbers as those in the flow chart illustrated in FIG. 17 are similar to those in FIG. 17, and thus a further description thereof is omitted.

If the answer to step S1703 is "No", the process proceeds to step S2201 in which the CPU 101 determines whether the multipage printing condition is to be changed. In the present embodiment, when a user selects "Yes" in the message box 2007 illustrated in FIG. 20C, the CPU 101 determines that the multipage printing condition is to be changed, and the CPU 101 advances the process to step S2202. On the other hand, in a case where the user selects "No" in the message box 2007 or in a case where the number of logical pages already existing on a physical page selected as the destination of a logical page is less than the maximum number of logical pages allowed in the multipage printing condition, the CPU 101 determines that the multipage printing condition is not to be changed, and the CPU 101 advances the process to step S1704.

Next, the process in step S2202 is described. In step S2202, the CPU 101 determines whether the change in the multipage printing condition to be applied to the physical page specified as the destination of the logical page is to be also applied to other physical pages. In the present embodiment, when the user selects "Yes" in the message box 2008 illustrated in FIG. 20D, the CPU 101 determines that the change in the multipage printing condition is to be also applied to other physical pages, and the CPU 101 advances the process to step S2203. On the other hand, when the user selects "No" in the message box 2008 in FIG. 20D, the CPU 101 determines that the change in the multipage printing condition is not to be applied to other physical pages, and the CPU 101 advances the process to step S2204.

In step S2203, the CPU 101 changes the multipage printing condition not only for the physical page specified as the destination of the logical page but also for all other physical pages. In the case where the multipage printing condition for the physical page specified as the destination of the logical page is changed from 2-in-1 to 4-in-1 as in the example illustrated in FIGS. 20A to 20D, the CPU 101 changes the multipage printing condition to 4-in-1 for all physical pages.

In step S2204, the CPU 101 changes the multipage printing condition for the physical page specified as the destination of the logical page. In this step, unlike in step S2203, the multipage printing condition is not changed for the other physical pages.

In the present embodiment, as described above, when the number of logical pages already existing in the physical page specified as the destination of the logical page is equal to the maximum number allowed in the multipage printing condition, a user is allowed to determine whether the multipage printing condition is to be changed depending on the purpose. When the multipage printing condition is changed, the user is allowed to further determine whether the multipage printing condition is to be applied to all other physical pages.

Third Embodiment

In a third embodiment described below, when the multipage printing condition is cancelled, if it becomes necessary to rotate a logical page as described above with reference to FIGS. 9A and 9B and FIGS. 10A and 10B, the direction of rotating the logical page may be determined based on the content of the setting of printing condition as described below.

Figure 23A:
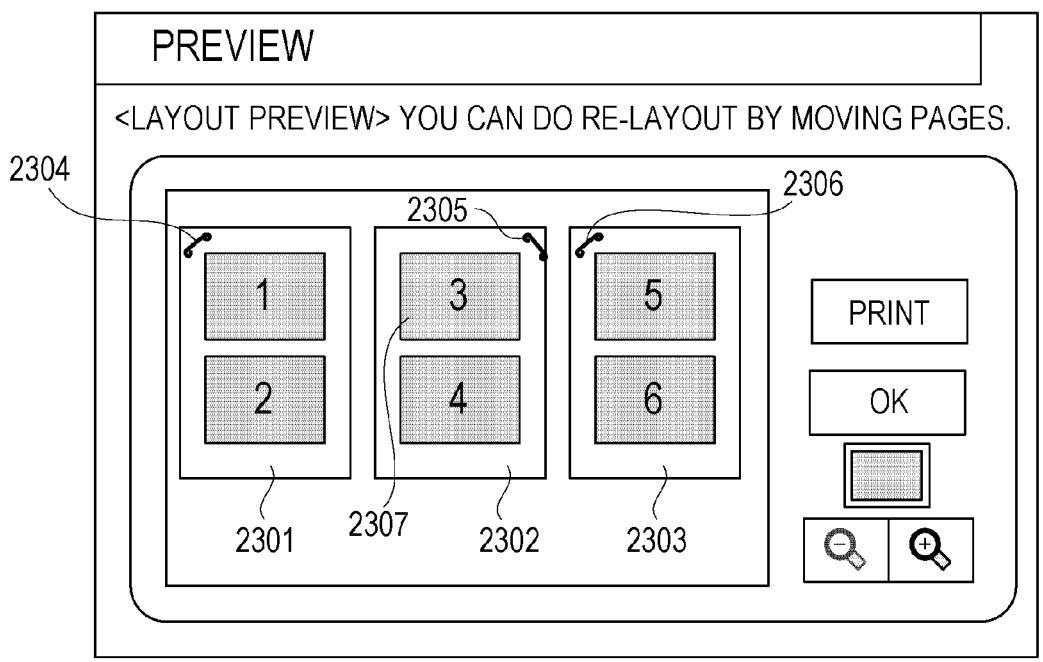
FIGS. 23A and 23B are diagrams illustrating examples of manners of changing a layout according to a third embodiment.

FIG. 23A illustrates a preview screen 2300 that is displayed on the operation unit 105 when a user selects the button 202 in the copy screen 200. In the following explanation, it is assumed by way of example that 2-in-1 is set as the layout of the multipage printing, and furthermore, stapling at the upper left corner and the duplex printing are specified.

Physical pages 2301 to 2303 are displayed in the preview screen 2300, and logical pages are laid out in the 2-in-1 layout pattern. In the present example, because the duplex printing is specified, the physical page 2302 is printed on a back side of the physical page 2301. In FIG. 23A, reference numerals 2304 to 2306 denote stapling positions.

Figure 23B:
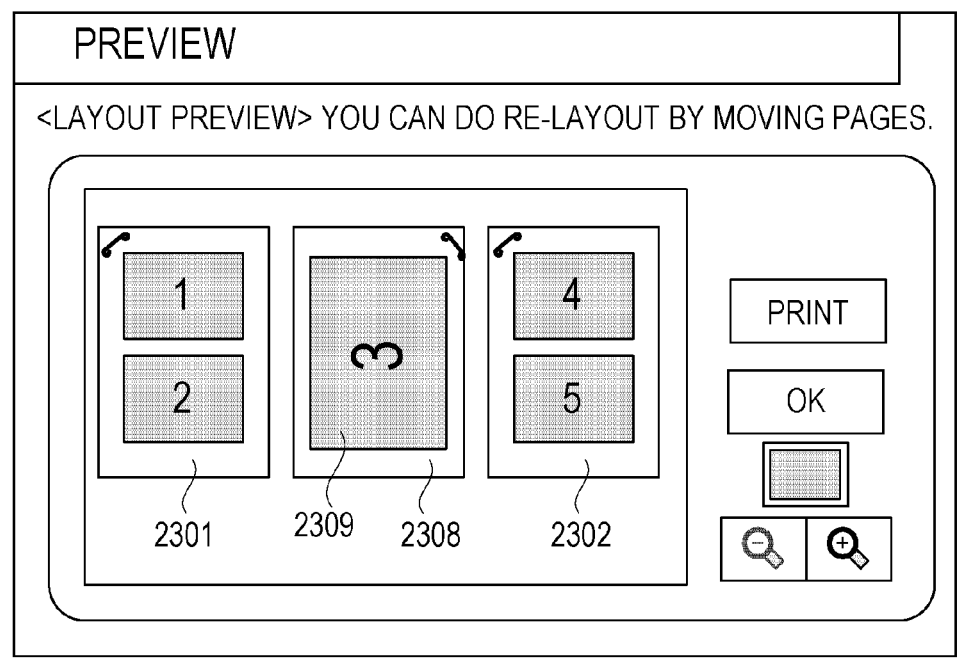
Figure 24A:
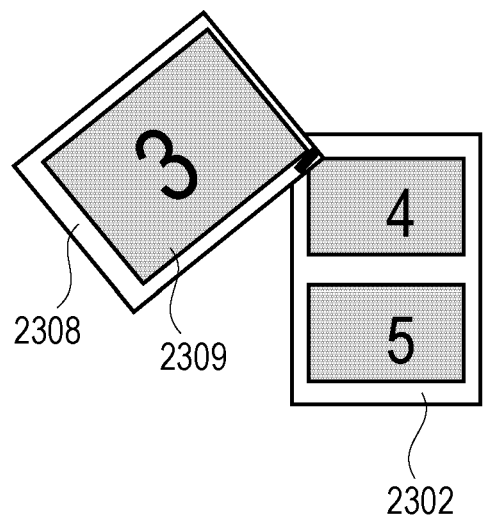
FIGS. 24A and 24B are diagrams illustrating examples of manners of changing a layout according to the third embodiment.
Figure 24B:
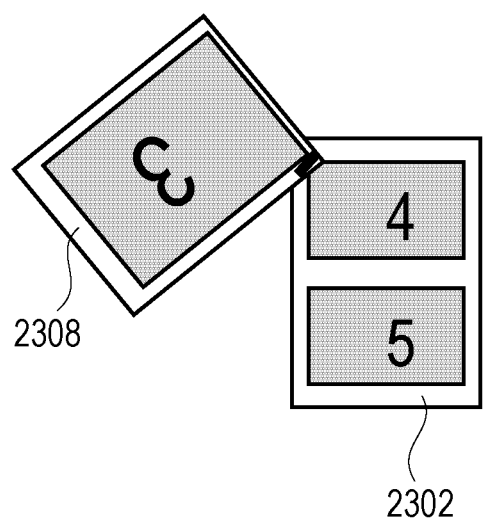

In the preview screen 2300, if a user touches the logical page 2307, drags it into between the physical page 2301 and the physical page 2302, and moves his/her finger away from the screen there, then a physical page 2308 is newly generated as illustrated in a preview screen 2310 illustrated in FIG. 23B. If it is assumed here that the physical page is generated without maintaining the multipage printing condition. In this case, as described above with reference to FIG. 10B, it is necessary to rotate the logical page 2307. In the present example, because the duplex printing and stapling at the upper left corner are specified, the logical page 2307 is rotated in the counterclockwise direction and laid out as a logical page 2309. The reason why the logical page 2307 is rotated not in the clockwise direction but in the counterclockwise direction is that the logical page 2309 rotated in the counterclockwise direction provides better readability when a user reads a printed matter held with his/her hand, as illustrated in FIG. 24A. Conversely, if the logical page 2307 is rotated in the clockwise direction, the resultant rotated logical page 2307 provides worse readability as illustrated in FIG. 24B.

In a case where the duplex printing and stapling at the upper right corner are specified in the setting of printing, if it becomes necessary to rotate a logical page when the multipage printing condition is cancelled, then the logical page is rotated not in the counterclockwise direction but in the clockwise direction.

In the present embodiment, as described above, when it becomes necessary to rotate a logical page as a result of cancelling the multipage printing condition, it is possible to determine the direction of rotating the logical page depending on the setting of printing such that the resultant rotated logical page provides good readability.

Other Embodiments

In the embodiments described above, it is assumed by way of example that the change of layout is allowed via an operation on the screen displayed on the operation unit 105 of the printing apparatus 100, but the embodiments may be applied to a wide variety of other apparatuses or systems. More specifically, in addition to the operation unit 105 of the printing apparatus 100, the embodiments may be applied to, for example, a PC in which a printer driver installed, a tablet device capable of setting printing conditions, etc.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-250852 filed Nov. 16, 2011, which is hereby incorporated by reference herein in its entirety.

What is claimed is:

1. A printing apparatus comprising:
a setting unit configured to set a multipage printing condition in which a plurality of logical pages are printed on a physical page corresponding to a sheet on which printing is performed;
a display unit configured to display a layout screen indicating a layout in which the plurality of logical pages are laid out on the physical page based on the multipage printing condition set by the setting unit;
an acceptance unit configured to accept a drag operation for a specific logical page among the plurality of logical pages, on the layout screen;
a selecting unit configured to, in a case where the specific logical page is moved by the drag operation, select a layout-changing process among a plurality of layout-changing processes, based on a destination area to which the specific logical page is moved; and
a processing unit configured to perform a layout-changing process selected by the selecting unit,
wherein the plurality of layout-changing processes include a first layout-changing process for inserting the specific logical page into a physical page corresponding to a destination area to which the specific logical page is moved, and a second layout-changing process for generating a new physical page in a destination area to which the specific logical page is moved and laying out the specific logical page on the new physical page.

2. The printing apparatus according to claim 1, wherein the processing unit lays out the specific logical page on the new physical page while maintaining the multipage printing condition set by the setting unit, in a case where the processing unit selects the second layout-changing process.

3. The printing apparatus according to claim 1, wherein the processing unit cancels the multipage printing condition set by the setting unit and lays out the specific logical page on the new physical page, in a case where the selecting unit selects the second layout-changing process.

4. The printing apparatus according to claim 1, wherein the processing unit determines, based on a user's instruction, whether to lay out the specific logical page on the new physical page while maintaining the multipage printing condition set by the setting unit and lay out the specific logical page on the new physical page while cancelling the multipage printing condition set by the setting unit, in a case where the selecting unit selects the second layout-changing process.

5. The printing apparatus according to claim 1, wherein the acceptance unit is configured to further accept a drag operation for a specific physical page among a plurality of physical pages, on the layout screen, and
when the specific physical page is moved by the drag operation, the processing unit changes an order of the plurality of physical pages.

6. The printing apparatus according to claim 5, wherein the display unit displays the layout screen by reducing a physical page such that a number of physical pages displayed on the layout screen in a case where the acceptance unit accepts the drag operation for the specific physical page is larger than a number of physical pages displayed on the layout screen in a case where the acceptance unit does not accept the drag operation for the specific physical page.

7. The printing apparatus according to claim 1, wherein the display unit is a touch panel, and
the acceptance unit is configured to accept a drag operation performed by a user on the touch panel.

8. The printing apparatus according to claim 1, further comprising:
a printing unit configured to perform printing processing based on the layout of the plurality of logical pages.

9. A method of changing a layout of a plurality of logical pages in multipage printing in which the logical pages are printed on a physical page corresponding to a sheet on which printing is performed, comprising:
setting a multipage printing condition;
displaying a layout screen indicating a layout in which the plurality of logical pages are laid out on the physical page based on the set multipage printing condition;
accepting a drag operation for a specific logical page among the plurality of logical pages, on the layout screen;
in a case where the specific logical page is moved by the drag operation, selecting a layout-changing process among a plurality of layout-changing processes, based on a destination area to which the specific logical page is moved; and
performing a selected layout-changing process,
wherein the plurality of layout-changing processes include a first layout-changing process for inserting the specific logical page into a physical page corresponding to a destination area to which the specific logical page is moved, and a second layout-changing process for generating a new physical page in a destination area to which the specific logical page is moved.

10. The method according to claim 9, wherein the processing lays out the specific logical page on the new physical page while maintaining the set multipage printing condition, in a case where the selecting selects the second layout-changing process.

11. The method according to claim 9, wherein the selecting cancels the set multipage printing condition and lays out the specific logical page on the new physical page, in a case where the selecting selects the second layout-changing process.

12. The method according to claim 9, wherein the processing determines, based on a user's instruction, whether to lay out the specific logical page on the new physical page while maintaining the set multipage printing condition and lay out the specific logical page on the new physical page while cancelling the multipage printing condition set by the setting, in a case where the selecting selects the second layout-changing process.

13. The method according to claim 9, wherein
the accepting further accepts a drag operation for a specific physical page among a plurality of physical pages, on the layout screen, and
when the specific physical page is moved by the drag operation, the processing changes an order of the plurality of physical pages.

14. The method according to claim 13, wherein the displaying displays the layout screen by reducing a physical page such that a number of physical pages displayed on the layout screen in a case where the accepting accepts the drag operation for the specific physical page is larger than a number of physical pages displayed on the layout screen in a case where the accepting does not accept the drag operation for the specific physical page.

15. The method according to claim 9, wherein
the displaying displays on a touch panel, and
the accepting accepts a drag operation performed by a user on the touch panel.

16. The method according to claim 9, further comprising:
performing printing processing based on the layout of the plurality of logical pages.

17. A non-transitory storage medium storing a program configured to control a computer to execute a method of changing a layout of a plurality of logical pages in multipage printing in which the logical pages are printed on a physical page corresponding to a sheet on which printing is performed, the method comprising:
setting a multipage printing condition;
displaying a layout screen indicating a layout in which the plurality of logical pages are laid out on the physical page based on the set multipage printing condition;
accepting a drag operation for a specific logical page among the plurality of logical pages, on the layout screen; and
in a case where the specific logical page is moved by the drag operation, selecting a layout-changing process among a plurality of layout-changing processes, based on a destination area to which the specific logical page is moved; and
performing a selected layout-changing process,
wherein the plurality of layout-changing processes include a first layout-changing process for inserting the specific logical page into a physical page corresponding to a destination area to which the specific logical page is moved, and a second layout-changing process for generating a new physical page in a destination area to which the specific logical page is moved.

* * * * *